United States Patent
Chang et al.

(10) Patent No.: US 8,831,409 B1
(45) Date of Patent: Sep. 9, 2014

(54) STORAGE MANAGEMENT TECHNOLOGY

(75) Inventors: Jack H. Chang, Saratoga, CA (US);
William H. Sheu, Fremont, CA (US);
Sherman Tuan, Cupertino, CA (US)

(73) Assignee: PurpleComm Inc., Santa Clara, CA (US)

( * ) Notice: Subject to any disclaimer, the term of this patent is extended or adjusted under 35 U.S.C. 154(b) by 1101 days.

(21) Appl. No.: 12/795,296

(22) Filed: Jun. 7, 2010

(51) Int. Cl.
*G06F 12/00* (2006.01)
*H04N 5/76* (2006.01)
*H04N 7/16* (2011.01)
*H04N 7/173* (2011.01)

(52) U.S. Cl.
USPC .................. 386/295; 711/159; 711/E12.069; 725/134; 725/142; 386/292; 386/293; 386/294

(58) Field of Classification Search
USPC ............ 711/159; 386/292–295; 725/134, 142
See application file for complete search history.

(56) References Cited

U.S. PATENT DOCUMENTS

| 7,089,579 | B1 | 8/2006 | Mao et al. | |
|---|---|---|---|---|
| 7,225,456 | B2 | 5/2007 | Kitsukawa et al. | |
| 8,069,192 | B2 * | 11/2011 | Rogers et al. | 707/821 |
| 2002/0184634 | A1 | 12/2002 | Cooper | |
| 2003/0110503 | A1 | 6/2003 | Perkes | |
| 2003/0221197 | A1 | 11/2003 | Fries et al. | |
| 2004/0049648 | A1 * | 3/2004 | Sato et al. | 711/164 |
| 2005/0081244 | A1 | 4/2005 | Barrett et al. | |
| 2006/0075428 | A1 | 4/2006 | Farmer et al. | |
| 2006/0288179 | A1 * | 12/2006 | Kihara et al. | 711/162 |
| 2007/0073728 | A1 * | 3/2007 | Klein et al. | 707/10 |
| 2007/0118680 | A1 * | 5/2007 | Boudou et al. | 711/103 |
| 2007/0255829 | A1 * | 11/2007 | Pecus et al. | 709/225 |
| 2007/0277219 | A1 | 11/2007 | Toebes et al. | |
| 2008/0022320 | A1 | 1/2008 | Ver Steeg | |
| 2008/0040712 | A1 * | 2/2008 | Tanaka | 717/168 |
| 2008/0115182 | A1 | 5/2008 | Van Willigenburg | |

FOREIGN PATENT DOCUMENTS

WO WO2006041784 A2 4/2006

\* cited by examiner

*Primary Examiner* — Aracelis Ruiz
(74) *Attorney, Agent, or Firm* — Fish & Richardson P.C.

(57) ABSTRACT

Storage management technology, in which a system determines a first amount of storage space on a downloader device of a user that is available for download of new content made available on channels subscribed to by the user. The system also determines a second amount of storage space needed to download new content that has been made available on channels subscribed to by the user. The system further compares the second amount of storage space to the first amount of storage space and determines whether the second amount of storage space exceeds the first amount of storage space. Based on a determination that the second amount of storage space exceeds the first amount of storage space, the system controls downloading of the new content to the downloader device and deletion of previously-stored content on the downloader device based on a content allocation policy.

16 Claims, 18 Drawing Sheets

300

DETERMINE A FIRST AMOUNT OF STORAGE SPACE ON A DOWNLOADER DEVICE OF A USER THAT IS AVAILABLE FOR DOWNLOAD OF NEW CONTENT MADE AVAILABLE ON CHANNELS SUBSCRIBED TO BY THE USER  *302*

↓

DETERMINE A SECOND AMOUNT OF STORAGE SPACE NEEDED TO DOWNLOAD NEW CONTENT THAT HAS BEEN MADE AVAILABLE ON CHANNELS SUBSCRIBED TO BY THE USER  *304*

↓

COMPARE THE SECOND AMOUNT OF STORAGE SPACE TO THE FIRST AMOUNT OF STORAGE SPACE  *306*

↓

DETERMINE WHETHER THE SECOND AMOUNT OF STORAGE SPACE EXCEEDS THE FIRST AMOUNT OF STORAGE SPACE  *308*

↓

BASED ON A DETERMINATION THAT THE SECOND AMOUNT OF STORAGE SPACE EXCEEDS THE FIRST AMOUNT OF STORAGE SPACE, CONTROL DOWNLOADING OF THE NEW CONTENT TO THE DOWNLOADER DEVICE AND DELETION OF PREVIOUSLY-STORED CONTENT ON THE DOWNLOADER DEVICE BASED ON A CONTENT ALLOCATION POLICY  *310*

FIG. 3

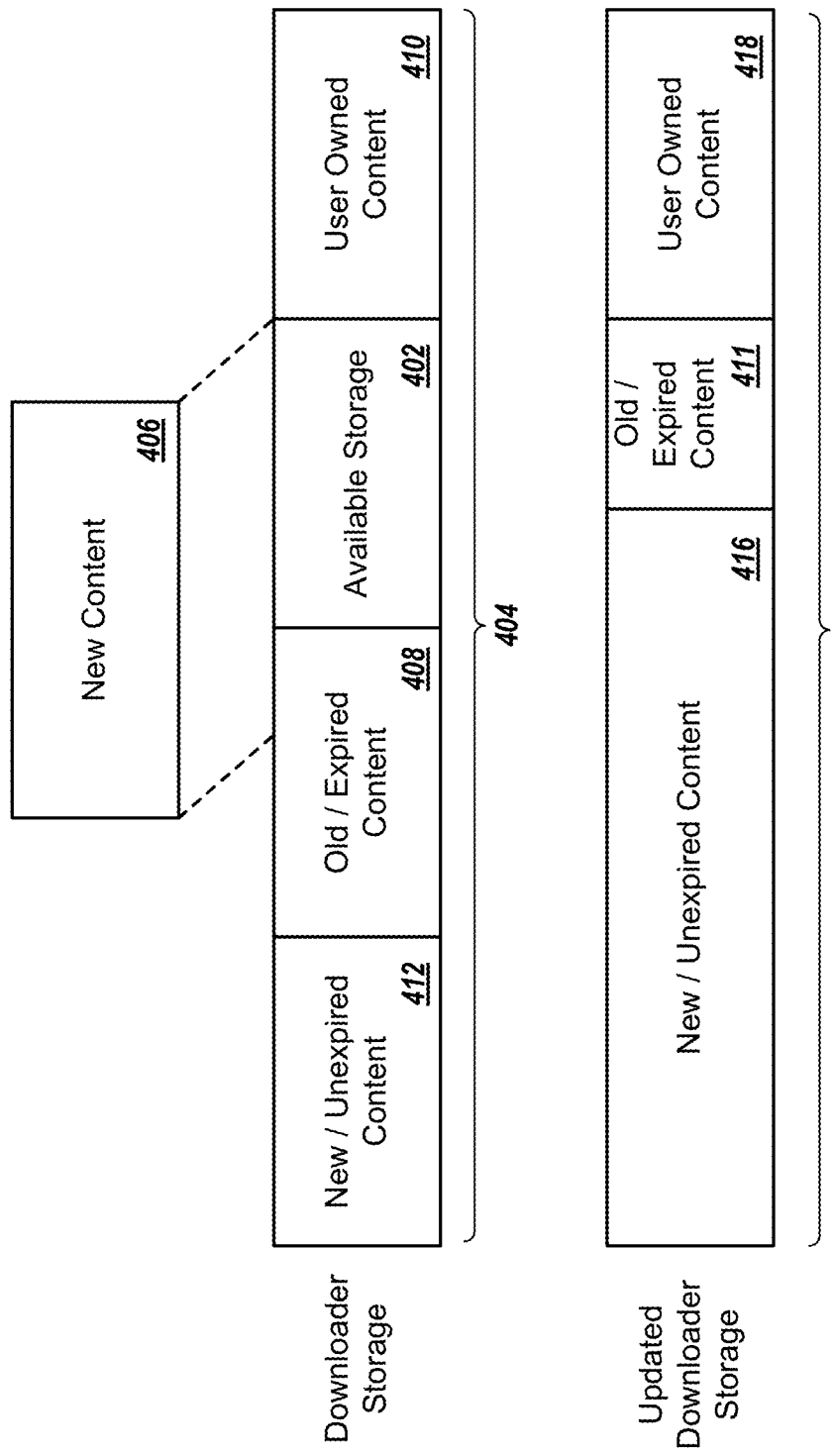

Channel Percentage Policy

Channel 1 – 50%
Channel 2 – 30%
Channel 3 – 20%          ⟿ 804

Viewing Statistics

Channel 1 – 40%
Channel 2 – 35%
Channel 3 – 25%          ⟿ 802

Updated Channel Percentage Policy

Channel 1 – 40%
Channel 2 – 35%
Channel 3 – 25%          ⟿ 806

FIG. 8

Content Expiration Policies

| | | |
|---|---|---|
| News Channel – | Expire After Two Weeks | *1502* |
| Movie Channel – | Expire After Watched | *1504* |
| DJ Channel – | News Content Expires After Seven Days<br>TV Show Content Expires After Thirty Days<br>All Content Expires After Watched<br>Show 2 Expires After Ten Days | *1506* |

News Channel  1518

| | Items | Watched Status | Expired Status |
|---|---|---|---|
| 1508 | News Program 1 – 10/26 | Not Watched | Not Expired |
| 1510 | News Program 2 – 10/19 | Watched 10/19 | Not Expired |
| 1512 | News Program 3 – 10/12 | Watched 10/12 | Expired 10/26 |
| 1514 | News Program 4 – 10/5 | Not Watched | Expired 10/19 |
| 1516 | News Program 5 – 9/28 | Watched 9/28 | Expired 10/12 |

Movie Channel  1530

| | Items | Watched Status | Expired Status |
|---|---|---|---|
| 1520 | Movie 1 | Watched 10/20 | Expired 10/20 |
| 1522 | Movie 2 | Not Watched | Not Expired |
| 1524 | Movie 3 | Not Watched | Not Expired |
| 1526 | Movie 4 | Not Watched | Not Expired |
| 1528 | Movie 5 | Watched 10/1 | Expired 10/1 |

DJ Channel  1542

| | Items | Watched Status | Expired Status |
|---|---|---|---|
| 1532 | Show 1 – 10/26 | Not Watched | Not Expired |
| 1534 | News Program 6 – 10/25 | Watched 10/25 | Expired 10/25 |
| 1536 | Show 2 – 10/1 | Not Watched | Expired 10/11 |
| 1538 | Show 3 – 9/15 | Not Watched | Expired 10/15 |
| 1540 | News Program 7 – 9/28 | Not Watched | Expired 10/5 |

Deletion Order List

| |
|---|
| Movie 5 |
| News Program 7 |
| Show 2 |
| News Program 5 |
| Show 3 |
| News Program 4 |
| Movie 1 |
| News Program 6 |
| News Program 3 |

```
┌─────────────────────────────────────────────────────┐
│   IDENTIFY CONTENT THAT IS STORED ON DOWNLOADER     │
│       DEVICE AND THAT IS TO BE ARCHIVED             │
│                                            1602     │
└─────────────────────────────────────────────────────┘
                          │
                          ▼
┌─────────────────────────────────────────────────────┐
│   COPY THE IDENTIFIED CONTENT TO AN ARCHIVAL DISK   │
│       CONNECTED TO THE DOWNLOADER DEVICE            │
│                                            1604     │
└─────────────────────────────────────────────────────┘
                          │
                          ▼
┌─────────────────────────────────────────────────────┐
│  ORGANIZE THE COPIED CONTENT ON THE ARCHIVAL DISK   │
│  TO ENABLE THE COPIED CONTENT TO BE PLAYED BY THE   │
│               DOWNLOADER DEVICE                     │
│                                            1606     │
└─────────────────────────────────────────────────────┘
```

FIG. 16

STORAGE MANAGEMENT TECHNOLOGY

FIELD

The present disclosure generally relates to storage management technology.

BACKGROUND

Content viewers today are exposed to an overwhelming amount of information and are challenged by the degree of interaction and personalization needed to manage this massive amount of information. In an era of digital communications, a user may be confused by an array of technology including traditional analog televisions, DVRs (Digital Video Recorders), PVRs (Personal Video Recorders), media centers, EPG (Electronic Program Guide)-based systems, Internet-related content, and traditional remote control devices.

SUMMARY

In one aspect, a method of controlling storage of content on a downloader device includes determining a first amount of storage space on a downloader device of a user that is available for download of new content made available on channels subscribed to by the user, determining a second amount of storage space needed to download new content that has been made available on channels subscribed to by the user, and comparing the second amount of storage space to the first amount of storage space. The method also includes determining whether the second amount of storage space exceeds the first amount of storage space and, based on a determination that the second amount of storage space exceeds the first amount of storage space, controlling downloading of the new content to the downloader device and deletion of previously-stored content on the downloader device based on a content allocation policy.

Implementations may include one or more of the following features. For example, the method may include, based on a determination that the second amount of storage space does not exceed the first amount of storage space, controlling downloading of the new content to the downloader device without deleting previously-stored content on the downloader device. The method also may include deleting a portion of the previously-stored content on the downloader device. The deleted portion of the previously-stored content may be less than the second amount of storage space needed to download the new content. The method further may include selecting a subset of the new content to download, controlling the downloader device to download the selected subset of the new content, and holding the new content that is not included in the selected subset for later download. The selected subset may be an amount of storage space that is less than or equal to the deleted portion of the previously-stored content.

In some implementations, the method may include defining a channel percentage allocation policy, analyzing channel information for the new content and the previously-stored content with respect to the channel percentage allocation policy, and controlling downloading of the new content and deletion of the previously-stored content based on the analysis of the channel percentage allocation policy. In these implementations, the method may include monitoring viewing behavior of one or more users of the downloader device, determining viewing statistics for the one or more users of the downloader device based on the monitoring, and defining the channel percentage allocation policy based on the determined viewing statistics.

In addition, the method may include receiving user input from the user of the downloader device indicating a channel percentage allocation policy and defining the channel percentage allocation policy based on the received user input. The method also may include defining a channel percentage allocation policy in which a particular percentage of available storage space associated with the downloader device is allocated to each of the channels subscribed to by the user. The method further may include determining, for each channel subscribed to by the user, a percentage of storage space needed to download new content associated with the channel and maintain previously-stored content associated with the channel and comparing, for each channel subscribed to by the user, the determined percentage of storage space for the channel with the particular percentage of available storage space allocated to the channel. Further, the method may include, based on the comparison of the determined percentage of storage space with the particular percentage of available storage space, controlling, for each channel subscribed to by the user, downloading of the new content for the channel and deletion of the previously-stored content for the channel such that content stored on the downloader device for the channel corresponds to the particular percentage of available storage space allocated to the channel.

In some examples, the method may include defining a channel percentage allocation policy in which a particular percentage of content items stored on the downloader device is allocated to each of the channels subscribed to by the user. In these examples, the method may include determining, for each channel subscribed to by the user, a percentage of content items included in new content associated with the channel and previously-stored content associated with the channel and comparing, for each channel subscribed to by the user, the determined percentage of content items for the channel with the particular percentage of content items allocated to the channel. Further, in these examples, the method may include, based on the comparison of the determined percentage of content items with the particular percentage of content items, controlling, for each channel subscribed to by the user, downloading of the new content for the channel and deletion of the previously-stored content for the channel such that a percentage of content items stored on the downloader device for the channel corresponds to the particular percentage of content items allocated to the channel.

In some implementations, the method may include defining a channel percentage allocation policy in which a particular percentage of viewing time of content stored on the downloader device is allocated to each of the channels subscribed to by the user. In these implementations, the method may include determining, for each channel subscribed to by the user, a percentage of viewing time included in new content associated with the channel and previously-stored content associated with the channel and comparing, for each channel subscribed to by the user, the determined percentage of viewing time for the channel with the particular percentage of viewing time allocated to the channel. Further, in these implementations, the method may include, based on the comparison of the determined percentage of viewing time with the particular percentage of viewing time, controlling, for each channel subscribed to by the user, downloading of the new content for the channel and deletion of the previously-stored content for the channel such that a percentage of viewing time of content stored on the downloader device for the channel corresponds to the particular percentage of viewing time allocated to the channel.

The method may include, for each channel subscribed to by the user, determining a number of content items for the channel, determining a total storage space used by the channel, and determining a total viewing time of content stored for the channel. The method also may include balancing the number of content items, the total storage space, and the total viewing time in allocating storage among the channels subscribed to by the user.

In some examples, the method may include controlling downloading of the new content to the downloader device and deletion of previously-stored content on the downloader device based on a content ownership policy. In these examples, the method may include accessing ownership information for stored content on the downloader device and determining whether the stored content on the downloader device is owned by the user based on the accessed ownership information. Based on a determination that the stored content on the downloader device is owned by the user, the stored content may be maintained in storage of the downloader device without deletion. Based on a determination that the stored content on the downloader device is not owned by the user, the stored content may be considered for deletion to enable downloading of the new content to the downloader device.

In some implementations, the method may include controlling downloading of the new content to the downloader device and deletion of previously-stored content on the downloader device based on a content expiration policy. In these implementations, the method may include accessing an expiration policy for stored content on the downloader device and determining whether the stored content on the downloader device is expired based on the accessed expiration policy. Based on a determination that the stored content on the downloader device is expired, the stored content may be considered for deletion based on expiration date. Based on a determination that the stored content on the downloader device is not expired, the stored content may be maintained in storage of the downloader device as unexpired.

In addition, the method may include, based on a determination that the stored content on the downloader device is not expired, considering the stored content for deletion if deletion of expired content is insufficient to accommodate the new content. The method also may include deleting the stored content in order of oldest expiration date. The method further may include accessing, for a first content item, a first expiration policy that defines an expiration policy for a first genre of content items to which the first content item corresponds and accessing, for a second content item, a second expiration policy that defines an expiration policy for a second genre of content items to which the second content item corresponds. The second expiration policy may be different than the first expiration policy and the second genre of content items may be different than the first genre of content items. In addition, the method may include accessing, for a third content item, a third expiration policy defined by a content curator for a channel that includes the third content item and accessing, for a fourth content item, a fourth expiration policy defined specifically for the fourth content item. The third expiration policy may be an expiration policy for the first genre of content items to which the third content item corresponds and may be different than the first expiration policy. The method may include determining whether the first content item is expired based on the first expiration policy, determining whether the second content item is expired based on the second expiration policy, determining whether the third content item is expired based on the third expiration policy, and determining whether the fourth content item is expired based on the fourth expiration policy.

In some examples, the method may include identifying content that is stored on the downloader device and that is to be archived and copying the identified content to an archival disk connected to the downloader device. In these examples, the method may include organizing the copied content on the archival disk to enable the copied content to be played by the downloader device.

In another aspect, a system includes at least one computer and at least one computer-readable medium coupled to the at least one computer having instructions stored thereon which, when executed by the at least one computer, causes the at least one computer to perform operations. The operations include determining a first amount of storage space on a downloader device of a user that is available for download of new content made available on channels subscribed to by the user and determining a second amount of storage space needed to download new content that has been made available on channels subscribed to by the user. The operations also include comparing the second amount of storage space to the first amount of storage space and determining whether the second amount of storage space exceeds the first amount of storage space. The operations further include, based on a determination that the second amount of storage space exceeds the first amount of storage space, controlling downloading of the new content to the downloader device and deletion of previously-stored content on the downloader device based on a content allocation policy.

In yet another aspect, at least one computer-readable storage medium is encoded with at least one computer program comprising instructions that, when executed, operate to cause a computer to perform operations. The operations include determining a first amount of storage space on a downloader device of a user that is available for download of new content made available on channels subscribed to by the user and determining a second amount of storage space needed to download new content that has been made available on channels subscribed to by the user. The operations also include comparing the second amount of storage space to the first amount of storage space and determining whether the second amount of storage space exceeds the first amount of storage space. The operations further include, based on a determination that the second amount of storage space exceeds the first amount of storage space, controlling downloading of the new content to the downloader device and deletion of previously-stored content on the downloader device based on a content allocation policy.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 3, 5, 7, 9, 11, 14, and 16 are flowcharts of exemplary processes.

FIGS. 4, 6, and 10 illustrate exemplary updates to downloader storage.

FIG. 8 illustrates an exemplary channel percentage policy.

FIG. 15 illustrates exemplary content expiration policies.

Like reference numbers represent corresponding parts throughout.

DETAILED DESCRIPTION

Figure 1:
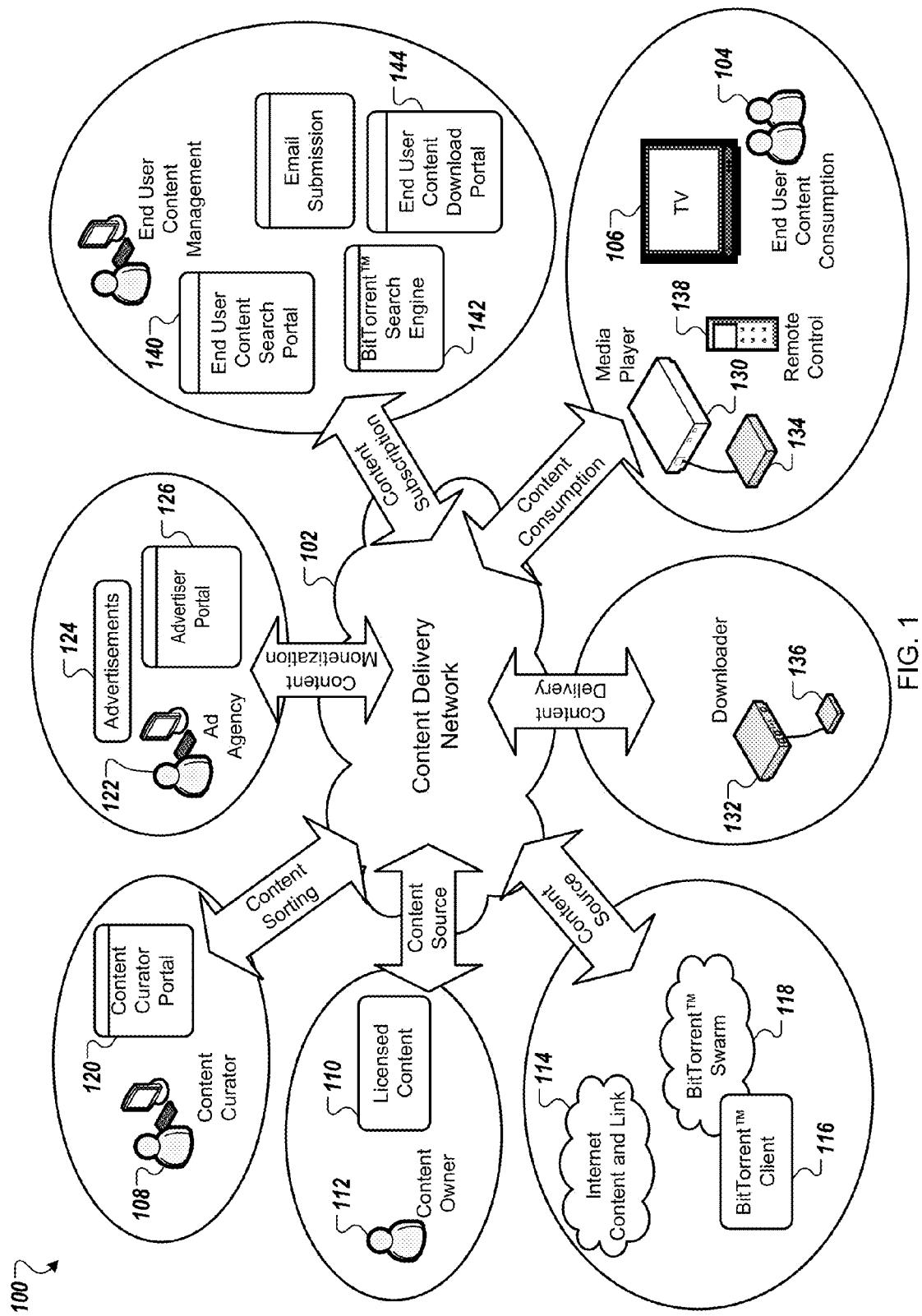
FIGS. 1, 2, and 18 are diagrams of exemplary systems.

FIG. 1 illustrates a content delivery system 100. The system 100 provides support for various aspects of content delivery, such as content sourcing, content sorting, content monetization, content subscription, content download, and content consumption. The content delivery system 100 includes a content delivery network 102. The content delivery network 102 may be one or more public or private, wired or wireless networks, such as the Internet or a Session Initiated Protocol (SIP) network such as the PsipTNT™ network offered by TelTel™. Using the system 100, end users 104 may view channels, for example, on a television 106 located in their home. Channels may be defined by end users 104, or by "content curators" 108.

Multiple types of content, such as audio (e.g., music, podcasts), video, and still images (e.g., photographs), may be made available over the content delivery network 102. Licensed and license-free content may be made available. For example, licensed content 110 may be acquired from a content owner 112.

Content may be made available from a variety of sources. For example, Internet content may be accessed from an Internet link 114 (e.g., URL (Uniform Resource Locator)). Content may also be accessed from peer-to-peer networks. For example, content may be accessed from one or more BitTorrent™ clients 116 which are part of one or more BitTorrent™ "swarms" 118. Content may be accessed from other sources, such as from a television broadcast (e.g., MSO (Multiple System Operator), cable, satellite, local) or from content (e.g., photographs, audio, previously recorded video) available from devices (e.g., DVR, stereo, computer, DVD (Digital Video Disc) player) connected to a user's home network and/or located in a user's home.

Content curators 108 may use a content curator portal 120 to define custom channels which may be made available for subscription by end users 104. The content curators 108 may be commissioned to search for, select, and organize multiple types of content from various sources into channels. Content curators 108 may, for example, organize channels by topic or genre. Content curators 108 may, for example, select licensed content, license-free content, BitTorrent™ content, or content from their private collection, to name a few examples.

Channels may be offered for free to end users 104 or end users 104 may subscribe to channels on a fee basis. Users may rate or rank channels or content curators based, for example, on programming selection, sequencing, and quality. Content curators 108 may be promoted, for example, based on popularity.

Content owners 112 may be compensated for the use of licensed content 110 that they own which is used in channels defined by content curators 108. For example, the system 100 may provide support for digital rights management (DRM). By allowing access to their licensed content 110, content owners 112 may experience increased distribution and revenue and targeted exposure in focused channels. Multiple revenue agreements may be possible, such as per-use agreements, subscription revenue sharing, and advertisement revenue sharing.

A content curator 108 may work with one or more advertisers 122, such as an ad agency, to include advertisements 124 on a channel. For example, an advertisement may be displayed if a user switches a channel or when a program finishes. As another example, advertisements may be displayed on the display of a remote control device, such as while a program is being displayed on a television. Content curators 108, advertisers 122, and content owners 112 may share advertising revenue. Sharing in advertising revenue may provide an incentive for content curators 108 to create interesting and popular channels. A content curator 108 may work with one or more advertisers 122 to create one or more advertisements 124 which are customized and targeted for one or more particular channels. End users 104 may customize advertisement viewing preferences, such as by specifying preferred topics, preferred or excluded companies, region preferences, etc.

Advertisers 122 may use an advertiser portal 126 to upload advertisements 124 and to control advertisement publication. Advertisers 122 may define and apply advertisement insertion rules to particular advertisements 124 and/or may allow a content curator 108 to decide when and how to insert the advertisements 124 into channels defined by the content curator 108. APIs (Application Programming Interfaces) may be provided which allow advertisers 122 to enable the system 100 to interface with standard advertisement inventory management systems to allow for control and management of advertisements 124. Various advertisement pricing plans may be supported, such as individually-priced ads or bulk pricing. Other advertising features may be included, such as online purchasing of items or providing customer contact options.

Advertisers 122, content curators 108, and content owners 112 may access user viewing behavior data. Advertisers 122 may access user viewing behavior data, such as viewed channels, viewed content, viewed advertisements, advertisement display frequency, advertisement viewed length, user actions during advertisement display, user characteristics, advertisement and content view times, advertisement and content view counts, and hosting channel information, to monitor reach and performance of advertising campaigns. Advertisements may be targeted to specific users based on recorded user viewing behavior data. Content curators 108 may access user viewing behavior data to learn about behaviors of end users 104 who subscribe to their channels. Content owners 112 may access user viewing behavior data to learn about their fan base, such as accessing information about user demographics, time of day of access, and user actions during content display. Content presentation and playback may be customized and personalized for a particular end user 104, based specifically on recorded user viewing behavior of the particular end user 104 and generally on recorded user viewing behavior of all users.

User viewing behavior data may be captured, for example, by a media player 130 and/or a downloader device 132. The media player 130 and/or the downloader device 132 may play content included or ordered on a channel defined by a content curator 108. In some implementations, the media player 130 may play content downloaded from the content delivery network 102 by the downloader device 132. In some implementations, the media player 130 and the downloader device 132 are different logical functions of the same physical device. In other implementations, the media player 130 and the downloader device 132 are different physical devices. In some implementations, the media player 130 is a software application which may be executed, for example, on a computing device such as a desktop or laptop computer.

The media player 130 and/or the downloader device 132 may be connected to external media storage devices 134, 136 respectively. The external media storage devices 134, 136 may be, for example, USB (Universal Serial Bus) drives. The external media storage devices 134, 136 may be used, for example, to transfer data to/from the media player 130 or the downloader device 132, respectively, such as to transfer data to/from a computing device.

The media player 130 and/or the downloader device 132 may communicate wirelessly with one or more remote control devices 138. The end user 104 may navigate through channels and perform other functions using the remote control device 138. The remote control device 138 may communicate (e.g., using Infrared (IR) technology of radio frequency (RF) technology) with the television 106, the media player 130, and/or the downloader device 132. The remote control device 138 also may communicate over a network with the media player 130 and/or the downloader device 132 to control functions of the media player 130 or the downloader device 132. The remote control device 138 may include a small display screen that displays preview content and/or advertisements.

The media player 130 and/or the downloader device 132 may download content from the content delivery network 102 without consuming resources of a computing device owned by the end user 104. For example, content may be downloaded into the home of an end user 104 without using resources of a personal computer owned by the end user 104. The media player 130 and the downloader device 132 may use less electricity than a personal computer, thus reducing the electric bill of the end user 104. The media player 130 and/or the downloader device 132 may connect to other computing devices connected on a user's home network. The media player 130 and/or the downloader device 132 may include built-in functionality to communicate with and download information from a peer-to-peer network, such as the BitTorrent™ swarm 118.

The end user 104 may search for and subscribe to content using an end-user content search portal 140. For example, the end-user content search portal 140 may provide a directory listing of available defined channels. The directory listing may be organized in a hierarchy of categories and sub-categories. A particular channel may appear in one or more categories or sub-categories. The end-user content search portal 140 may also provide a search function to allow end users to search for available defined channels based on a keyword search. As another example, users may search for channels based on other criteria, such as sorting channels based on channel or content curator popularity or ranking. An end user may subscribe to a defined channel, for example, by selecting a channel link displayed in a directory listing or in a list of search results.

The end user 104 may also search for and initiate download of individual content items to the downloader device 132 using a partner site such as a BitTorrent™ search engine 142. As another example, the end user 104 may send an email which includes a content link to an email address associated with their downloader device 132 to initiate an automatic download to the downloader device 132 of the content linked to by the content link. The content link may refer to a content file available on the Internet, and may be a reference to a video resource available from a streaming video website. The end user 104 may send an email with an attachment to an email address associated with the downloader device 132, to initiate a download of the attachment to the downloader device 132. The end user 104 may use an end-user content download portal 144 to search for and to select content to download to the downloader device 132.

Figure 2:
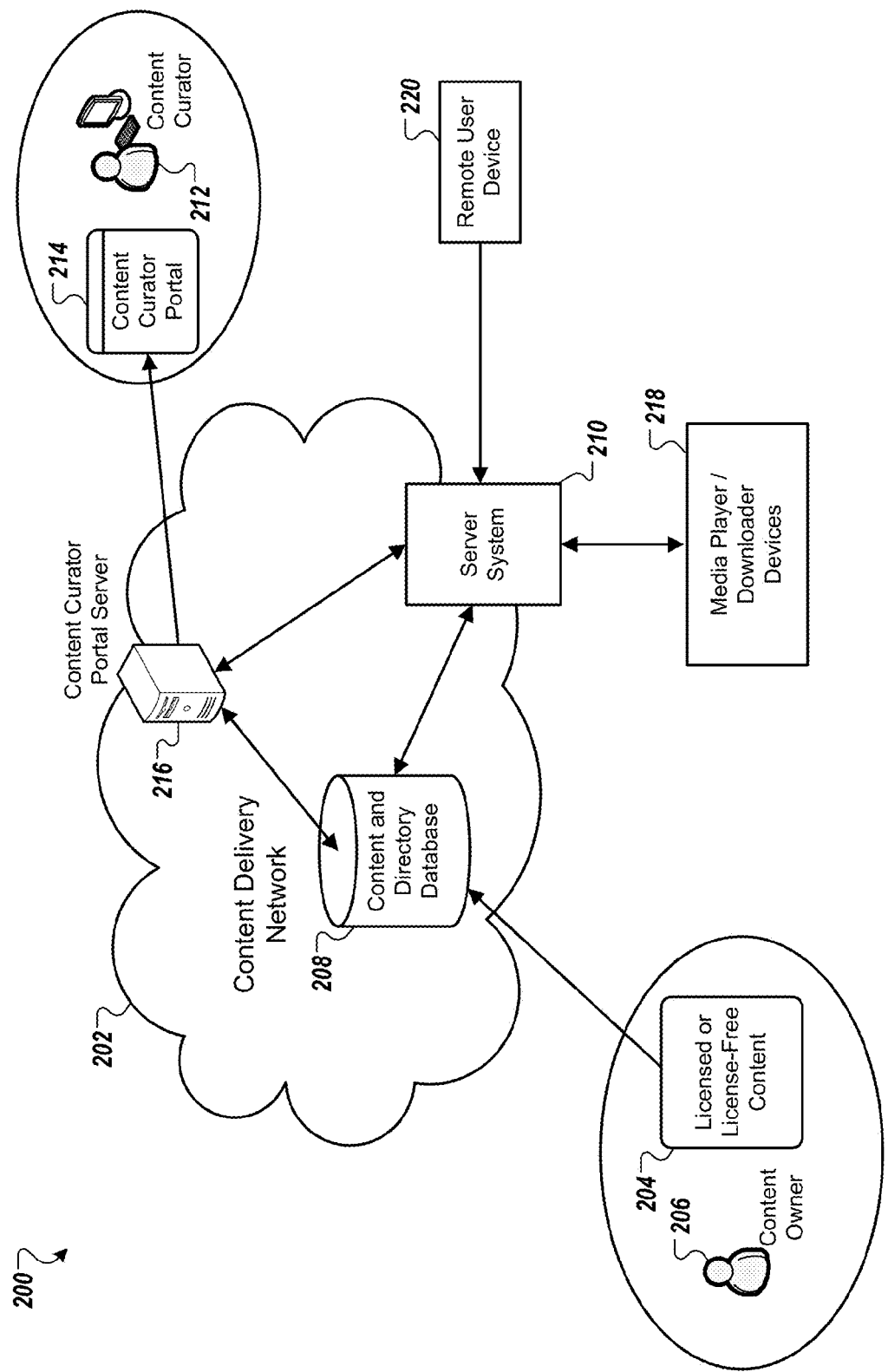

FIG. 2 illustrates a system 200 for content sourcing and download over a content delivery network 202. Licensed or license-free content 204 is acquired from one or more content owners 206 or from a publicly available source, such as the Internet. For example, content owners 206 may transfer content over the content delivery network 202 to a content and directory database 208. Content may also be transferred to the content and directory database 208 from a server system 210, such as using a DVD or CD (Compact Disc) drive. License-free content, such as license-free video or podcasts, may be downloaded from the Internet and stored in the content and directory database 208. In some implementations, some or all content may be stored in the content and directory database 208 as BLOBs (Binary Large Objects). In some implementations, some or all content may be stored in the file system of the server system 210 and references to file system locations may be stored in the content and directory database 208.

The content and directory database 208 stores information about content and also information about defined channels. Content curators 212 may use a content curator portal 214 to define channels and to manage defined channels. The content curator portal 214 may display a listing of licensed and license-free content available in the content and directory database 208. The content curator portal 214 may also provide a search function which allows the content curator 212 to search for content available in the content and directory database 208 and to also search for content included in the private collection of the content curator 212 or content available on the Internet, such as content available from peer-to-peer networks, such as BitTorrent™.

The content curator portal 214 may communicate with a content curator server 216. For example, a channel definition defined using the content curator portal 214 may be sent to the content curator server 216, which may communicate with the server system 210 to request that the channel definition be stored in the content and directory database 208. As another example, information for existing channel definitions associated with a particular content curator 212 may be retrieved from the content and directory database 208 and sent from the content curator portal server 216 to the content curator portal 214 for display.

In some implementations, the content curator portal server 216 is one physical server computing device and in other implementations, the content curator portal server 216 includes multiple physical server computing devices. Similarly, in some implementations, the server system 210 is one physical server computing device, and in other implementations, the server system 210 includes multiple physical server computing devices. In some implementations, multiple physical server computing devices are used, with some or all server computing devices implementing both the content curator portal server 216 and the server system 210. In some implementations, one physical server computing device is used, with the one physical server device implementing both the content curator portal server 216 and the server system 210.

The network 202 may be one or more public or private, wired or wireless networks, such as the Internet, or may be a Session Initiated Protocol (SIP) network such as the PsipTNT™ network offered by TelTel™. The network 202 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any other delivery or tunneling mechanism for carrying data services. The network 202 may include multiple networks or subnetworks, each of which may include, for example, a wired or wireless data pathway.

Content may be downloaded to one or more user media player/downloader devices 218. For example, content corresponding to a user-subscribed channel may be automatically downloaded to the media player/downloader device 218, in response to a user selection of a corresponding channel. As another example, a user may search for and download content to the media player/downloader device 218. A user may, using a remote user device 220, monitor and manage user-initiated downloads. The remote user device 220 may be any type of electronic device configured to exchange communications with the server system 210 over a network. The remote user device 220 may be a general-purpose computer (e.g., a desktop personal computer, a workstation, or a laptop computer), a mobile or wireless device, or a device designed for a specific function (e.g., a cell phone, a smart phone, a tablet PC, a personal digital assistant (PDA), etc.).

FIG. 3 illustrates a process 300 for controlling downloading of new content and deletion of previously-stored content. The operations of the process 300 are described generally as being performed by the system 200. The operations of the process 300 may be performed by one of the components of the system 200 (e.g., the server system 210) or may be performed by a combination of the components of the system 200. In some implementations, operations of the process 300 may be performed by one or more processors included in one or more electronic devices.

The system 200 determines a first amount of storage space on a media player/downloader device of a user that is available for download of new content made available on channels subscribed to by the user (302). For example, in reference to FIG. 1, an amount of storage space available on the downloader device 132 may be determined. As another example and as shown in FIG. 4, an amount of available storage 402 included in a media player/downloader storage 404 may be determined.

Returning to FIG. 3, the system 200 determines a second amount of storage space needed to download new content that has been made available on channels subscribed to by the user (304). For example, in reference to FIG. 1, the content curator 108 may have added new licensed content 110 to a channel subscribed to by the end user 104. The system 200 may determine a total storage size of the new content added to the channel. In the example of FIG. 4, a size of new content 406 may be determined. The new content 406 may include one or more content files made available by one or more content curators on one or more channels subscribed to by a user who owns a media player/downloader device which includes the media player/downloader storage 404.

The system 200 compares the second amount of storage space to the first amount of storage space (306). In the example of FIG. 1, the size of the licensed content 110 may be compared to the amount of available storage on the downloader device 132. In the example of FIG. 4, the system 200 may compare the size of the new content 406 to the size of the available storage 402.

The system 200 determines whether the second amount of storage space exceeds the first amount of storage space based on the comparison (308). If the second amount of storage space does not exceed the first amount of storage space, it may be determined, for example, that all of the new content may fit on the media player/downloader device without removal of any previously-stored content. If the second amount of storage space exceeds the first amount of storage space, it may be determined, for example, that some of the previously-stored content stored in the media player/downloader device may need to be removed to allow download of all of the new content. For example and as illustrated in FIG. 4, the size of the new content 406 is larger than the size of the available storage 402. In other words, some, but not all, of the new content 406 fits into the available storage 402.

Based on a determination that the second amount of storage space exceeds the first amount of storage space, the system 200 controls downloading of the new content to the media player/downloader device and deletion of previously-stored content on the media player/downloader device based on a content allocation policy (310). In the example of FIG. 4, to enable download of all of the new content 406, some or all of expired content 408 may be deleted. Expiration of content may be based, for example, on one or more content expiration policies. User-owned content 410 may generally not be deleted by the system 200 to make room in the media player/downloader storage 404 for the new content 406 (e.g., deletion of user-owned content 410 may be controlled by the user). In some implementations, new/unexpired content 412 is not deleted to make room for the new content 406 in the media player/downloader storage 404. In other implementations, some unexpired content 412 may be deleted to make room for the new content 406 to the extent deletion of all expired content is insufficient to accommodate all of the new content.

In the example of FIG. 4, the available storage 402 may be used to store some of the new content 406. To make room for the remainder of the new content 406 that does not fit into the available storage 402, some of the expired content 408 may be deleted. An updated media player/downloader storage 414 shows results of storing the new content 406 while deleting some previously-stored content. Deletion of some of the expired content 408 is illustrated by expired content 411 in the updated media player/downloader storage 414 having a smaller size than the expired content 408. The new content 406 is included in the updated media player/downloader storage 414 in updated new/unexpired content 416, where the updated new/unexpired content 416 has a larger size than the new/unexpired content 412. User-owned content 418 included in the updated media player/downloader storage 414 is the same size and includes the same content as the user-owned content 410 (e.g., the user-owned content 410 is not modified when storing the new content 406 in the updated media player/downloader storage 414).

Returning to FIG. 3, as another example, a portion of the previously-stored content on the media player/downloader device may be deleted, where the portion is less than the second amount of storage space needed to download the new content. A subset of the new content to download may be selected, where the selected subset needs an amount of storage space that is less than or equal to the deleted portion of the previously-stored content. The media player/downloader device may be controlled to download the selected subset of the new content and the new content that is not included in the selected subset may be held (e.g., not downloaded), to be downloaded at a later time.

Figure 5:
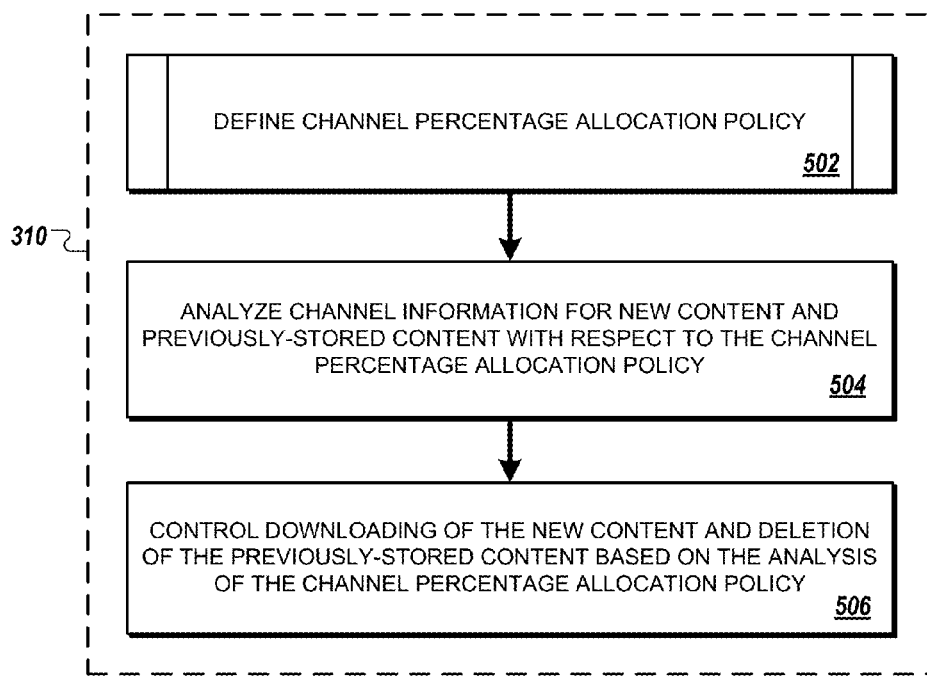

A content allocation policy may be based, for example, on a channel percentage allocation policy. FIG. 5 illustrates a process 500 for controlling download of new content to a media player/downloader device based on a channel percentage allocation policy. The process 500 may be used in controlling download of new content to a media player/downloader device referenced above with respect to reference numeral 310. The operations of the process 500 are described generally as being performed by the system 200. The operations of the process 500 may be performed by one of the components of the system 200 (e.g., the server system 210) or may be performed by a combination of the components of the system 200. In some implementations, operations of the process 500 may be performed by one or more processors included in one or more electronic devices.

Figure 6:
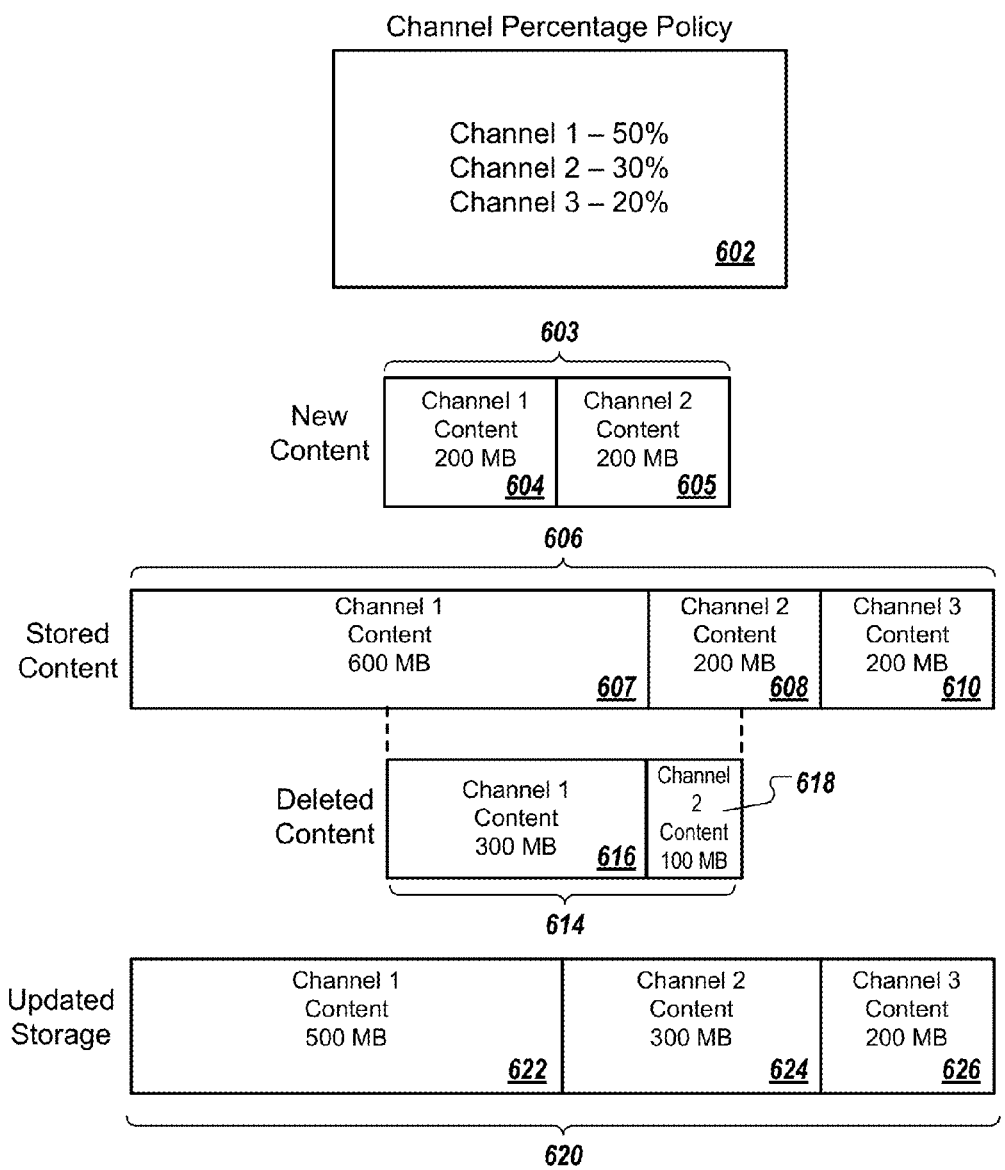

The system 200 defines a channel percentage allocation policy (502). For example, a channel percentage allocation policy may be defined for a user based on channels subscribed to by the user, with a percentage of the user's media player/downloader device storage allocated to each subscribed channel. For example, FIG. 6 illustrates an example channel percentage allocation policy 602 which defines media player/downloader storage percentages associated with user-subscribed channels one, two and three. The channel percentage allocation policy 602 specifies that fifty percent of the user's media player/downloader device storage is allocated to channel one, thirty percent of the user's media player/downloader device storage is allocated to channel two, and twenty percent of the user's media player/downloader device storage is allocated to channel three.

Figure 7:
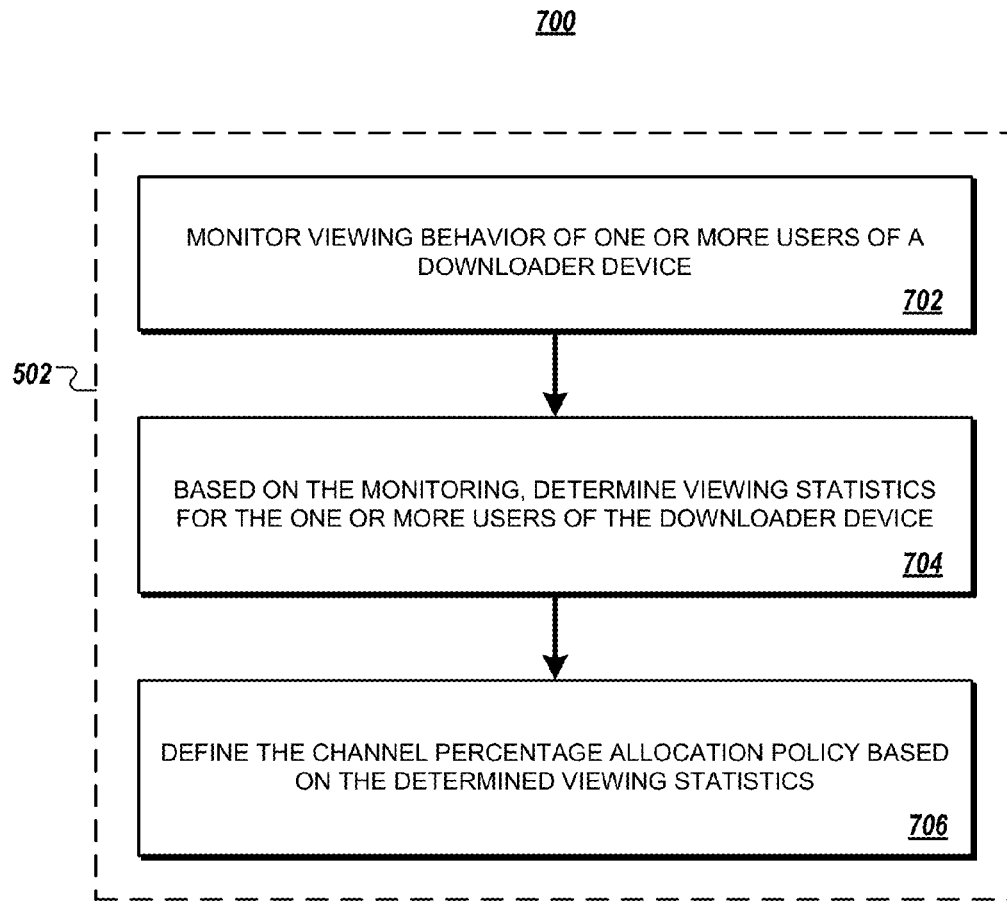

A channel allocation policy may be defined based on monitoring a user's content viewing behavior. For example, FIG. 7 illustrates a process 700 for defining a channel percentage allocation policy based on viewing statistics determined based on monitoring viewing behavior of one or more users of a media player/downloader device. The process 700 may be used in defining a channel percentage allocation policy referenced above with respect to reference numeral 502. The operations of the process 700 are described generally as being performed by the system 200. The operations of the process 700 may be performed by one of the components of the system 200 (e.g., the server system 210) or may be performed by a combination of the components of the system 200. In some implementations, operations of the process 700 may be performed by one or more processors included in one or more electronic devices.

The system 200 monitors viewing behavior of one or more users of a media player/downloader device (702). For example, a user's viewing behavior may be monitored by a downloader device and/or a media player device (e.g., downloader device 132 and/or media player 130, FIG. 1). The downloader device 132 and/or the media player 130 may, for example, monitor when a user watches a channel, when a user watches a content file, when a user deletes a content file, etc.

Based on the monitoring, the system 200 determines viewing statistics for the one or more users of the media player/downloader device (704). For example, statistics may be determined which indicate how often a user deletes content, how long a user typically saves a content file, or whether a user typically watches a content file once or watches a content file multiple times. Other statistics may indicate how often a user watches a particular channel. For example, percentages may be determined for each channel that a user watches, where each percentage indicates a percentage of the user's total viewing time spent watching a particular channel.

The system 200 defines the channel percentage allocation policy based on the determined viewing statistics (706). For example, FIG. 8 illustrates viewing statistics 802 which indicate that a user watches channel one forty percent of the time, channel two thirty-five percent of the time, and channel three twenty-five percent of the time. A previously-defined channel percentage policy 804 indicates percentages of fifty percent for channel one, thirty percent for channel two, and twenty percent for channel three.

One or more factors may contribute to the differences between corresponding percentages in the viewing statistics 802 and the previously-defined channel percentage policy 804. For example, the previously-defined channel percentage policy 804 may be based on a user's past viewing behavior or may include default percentages used for all users. The user's viewing behavior may change over time and the viewing statistics 802 may reflect a user's recent viewing behavior. In some implementations, a user's viewing behavior is monitored periodically, which may result in updated viewing statistics 802.

The previously-defined channel percentage policy 804 may be updated to an updated channel percentage policy 806, based on the viewing statistics 802. For example, the updated channel percentage policy 806 indicates percentages of forty percent for channel one, thirty-five percent for channel two, and twenty-five percent for channel three, which matches the corresponding percentages in the viewing statistics 802. If the viewing statistics 802 are updated periodically, the updated channel percentage policy 806 may be periodically updated to correspond to the updated viewing statistics 802.

Returning to FIG. 5, the system 200 analyzes channel information for new content and previously-stored content with respect to the channel percentage allocation policy (504). For example, the system 200 may determine, for each channel for which content is currently stored, a percent of media player/downloader storage associated with the channel. The system 200 may also determine, for each channel for which new content is identified, the size of the new content for the channel. For instance, in the example of FIG. 6, new content 603 includes two hundred megabytes (MB) of content 604 for channel one and two hundred MB of content 605 for channel two. Previously-stored content 606 includes six hundred MB of content 607 for channel one, two hundred MB of content 608 for channel two, and two hundred MB of content 610 for channel three. There is currently no unused storage in the previously-stored content 606 (e.g., all available storage is being used to store the content 607, 608, and 610).

The previously-stored content 610 for channel three is twenty percent of the total size of the previously-stored content 606, which matches the twenty percent specified for channel three in the channel percentage allocation policy 602. However, the previously-stored content 607 for channel one is sixty percent of the total size of the previously-stored content 606, which is higher than the fifty percent specified for channel one in the channel percentage allocation policy 602. Additionally, the previously-stored content 608 for channel two is twenty percent of the total size of the previously-stored content 606, which is lower than the thirty percent specified for channel two in the channel percentage allocation policy 602.

Returning to FIG. 5, the system 200 controls downloading of the new content and deletion of the previously-stored content based on the analysis of the channel percentage allocation policy (506). For instance, in the example of FIG. 6, since there is no new content for channel three, and since the current percentage of the previously-stored content 606 used for channel three agrees with the channel percentage allocation policy 602, the content 610 for channel three may remain unmodified during the processing of the new content 603. To make room for the new content 603, some or all of the content 607 for channel one and some or all of the content 608 for channel two may be deleted from the previously-stored content 606.

The amount to delete from the content 607 and the content 608 may be based on the fact that the current percentage of the previously-stored content 606 used for channel one is higher than the percentage for channel one specified in the channel percentage allocation policy 602 and that the current percentage of the previously-stored content 606 used for channel two is lower than the percentage for channel two specified in the channel percentage allocation policy 602 (e.g., a larger amount of content may be deleted from the content 607 for channel one than from the content 608 for channel two). For example, deleted content 614 illustrates that three hundred MB of content 616 for channel one and one hundred MB of content 618 for channel two is deleted from the previously stored content 606.

Updated storage 620 reflects the deletion of the deleted content 614 from the previously-stored content 606 and the addition of the new content 603 to the previously-stored content 606. Updated content 622 for channel one, which is five hundred MB, is fifty percent of the total size of the updated storage 620, which matches the fifty percent specified for channel one in the channel percentage allocation policy 602. Similarly, updated content 624 for channel two, which is two hundred MB, is twenty percent of the total size of the updated storage 620, which matches the twenty percent specified for channel two in the channel percentage allocation policy 602. Content 626 for channel three included in the updated storage 620 is the same size and includes the same content as the content 610 for channel three in the previously-stored content 606 (e.g., the content 610 for channel three is not modified when storing the new content 603 in the updated storage 620).

Figure 9:
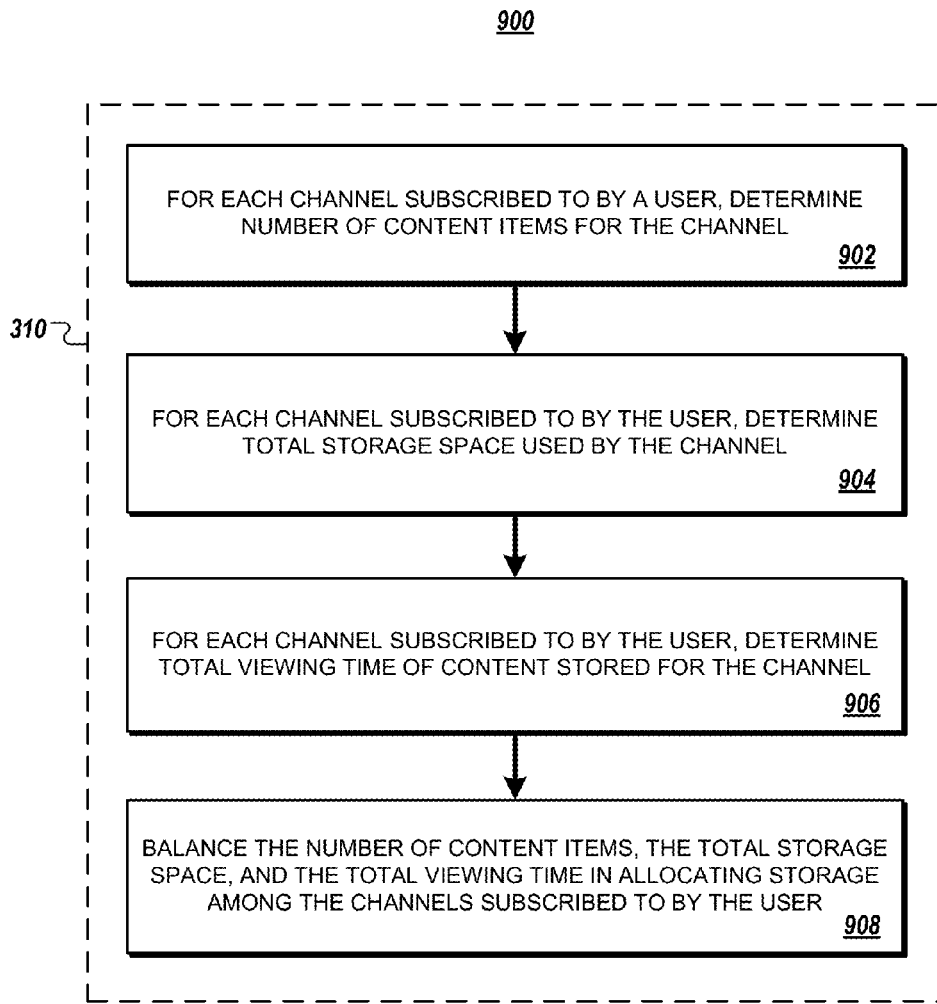

A content allocation policy may be based on factors other than the size of content files (e.g., as shown in FIG. 6). For example, FIG. 9 illustrates a process 900 for allocating storage space of a media player/downloader device to balance multiple factors across channels, such as the number of content items, the total storage space used, and the total viewing time (e.g., playback time of content or length) of each channel. The process 900 may be used in controlling download of new content to a media player/downloader device referenced above with respect to reference numeral 310. The operations of the process 900 are described generally as being performed by the system 200. The operations of the process 900 may be performed by one of the components of the system 200 (e.g., the server system 210) or may be performed by a combination of the components of the system 200. In some implementations, operations of the process 900 may be performed by one or more processors included in one or more electronic devices.

Figure 10:
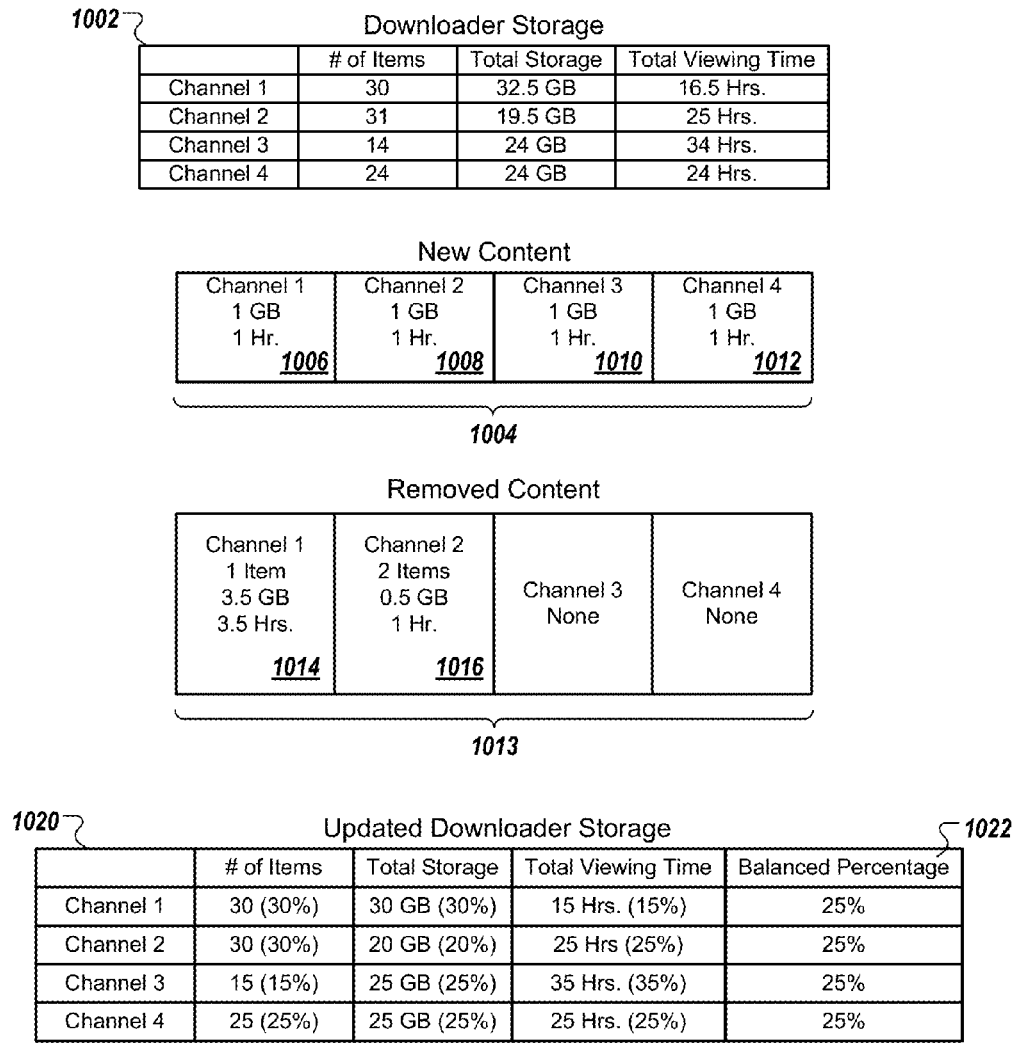

For each channel subscribed to by a user, the system 200 determines a number of content items for the channel (902). For example, for each channel subscribed to by a user, the number of content items stored on a media player/downloader device of the user may be determined. For example, FIG. 10 illustrates a media player/downloader storage 1002 which includes content items for channels one, two, three, and four. The media player/downloader storage 1002 includes thirty content items for channel one, thirty one content items for channel two, fourteen content items for channel three, and twenty four content items for channel four.

For each channel subscribed to by the user, the system 200 determines a total storage space used by the channel (904). For example, for each channel, the system 200 may determine the storage size for each content item for the channel and may add together the individual storage sizes of each content item. In the example of FIG. 10, the content items in the media player/downloader storage 1002 for channels one to four occupy thirty two and one half gigabytes (GB), nineteen and one half GB, twenty four GB, and twenty four GB of storage space, respectively. The storage size of a content item may be determined by examining metadata for the content item, by querying a file system file size attribute, or by processing the content item to determine the size of the content item, to name a few examples.

For each channel subscribed to by the user, the system 200 determines a total viewing time of content stored for the channel (906). For example, for each channel, the system 200 may determine the viewing time (e.g., playback time) for each content item for the channel and may add together the viewing times of each content item. In the example of FIG. 10, the content items in the media player/downloader storage 1002 for channels one to four have total viewing times of sixteen and one half hours, twenty five hours, thirty four hours, and twenty four hours, respectively. The viewing time of a content item may be determined, for example, by examining metadata for the content item.

Two or more content items with the same viewing time may occupy different amounts of storage space. For example, a first content item may have been compressed using a different compression process than a second content item. As another example, a first content item may have a different video quality than a second content item.

The system 200 balances the number of content items, the total storage space, and the total viewing time in allocating storage among the channels subscribed to by the user (908). In some implementations, factors other than number of content items, storage space, and viewing time may be used when performing balancing. The system 200 may balance the number of content items, the total storage space, and the total viewing time in response to new content being downloaded to a media player/downloader device. In the example of FIG. 10, new content 1004 is to be downloaded to the media player/downloader storage 1002. The new content 1004 includes content 1006, 1008, 1010, and 1012 for channels one to four, respectively, where each content 1006, 1008, 1010, and 1012 includes one content item including one hour of viewing time and occupying one GB of storage.

To perform balancing, the number of content items to add, the total storage space of content items to add, and the total viewing time of content items to add may be analyzed, in addition to analyzing the current number of content items, the current total storage space, and the current total viewing time. To reach a balanced level of content items, total storage space, and total viewing time, expired content items may be removed from one or more channels. For instance, in the example of FIG. 10, removed content 1013 is removed from the media player/downloader storage 1002. The removed content 1013 includes content 1014 for channel one and content 1016 for channel two. The content 1014 includes one content item including three and one half hours of viewing time and occupying three and one half GB of storage. The content 1016 includes two content items including one hour of viewing time and occupying one half GB of storage.

The removed content 1013 is selected so that content remaining in an updated media player/downloader storage 1020 is balanced (or nearly balanced (e.g., as balanced as possible)). The updated media player/downloader storage 1020 illustrates the removal of the removed content 1013 from the media player/downloader storage 1002 and the adding of the new content 1004 to the media player/downloader storage 1002. Balancing of the updated media player/downloader storage 1020 may be achieved by selecting removed content 1013 so that a balanced percentage 1022 exists for each channel. For example, the balanced percentage 1022 is twenty-five percent for each channel.

For each channel, a percent of content items, a percent of total storage, and a percent of total viewing time is calculated. For example, thirty percent of all content items in the updated media player/downloader storage 1020 are for channel one, thirty percent of all content items in the updated media player/downloader storage 1020 are for channel two, fifteen percent of all content items in the updated media player/downloader storage 1020 are for channel three, and twenty-five percent of all content items in the updated media player/downloader storage 1020 are for channel four. As another example, thirty percent of the total storage in the updated media player/downloader storage 1020 is used for channel one, twenty percent of the total storage in the updated media player/downloader storage 1020 is used for channel two, twenty-five percent of the total storage in the updated media player/downloader storage 1020 is used for channel three, and twenty-five percent of the total storage in the updated media player/downloader storage 1020 is used for channel four. Similarly, fifteen percent of the total viewing time of the content items in the updated media player/downloader storage 1020 is for channel one, twenty-five percent of the total viewing time of the content items in the updated media player/downloader storage 1020 is for channel two, thirty-five percent of the total viewing time of the content items in the updated media player/downloader storage 1020 is for channel three, and twenty-five percent of the total viewing time of the content items in the updated media player/downloader storage 1020 is for channel four.

For each channel, the balanced percentage 1022 is the average of the percent of content items, the percent of total storage, and the percent of total viewing time for the channel. In the example of FIG. 10, each of the balanced percentages 1022 are twenty-five percent. In some examples, the balanced percentages may not be exactly equal to one another. A combination of content items may be selected for removal from media player/downloader storage based on the removal of the selected combination of content items resulting in the balanced percentages being equal or in the balanced percentages being closer to equal than if other possible combinations of content items are removed. In some implementations, a content file is treated as an atomic unit, meaning that when a content file is downloaded, the entire content file is downloaded, and if a content file is removed, the entire content file (and not just a portion of the content file) is removed.

Although the balanced percentages may be the same (or nearly the same) for each channel, some channels may have higher percentages for some factors and lower percentages for other factors. For example, the percent of content items and the percent of total storage for channel one are each higher than the percent of total viewing time for channel one (e.g., although channel one has a relatively high number of content items and amount of storage space as compared to other channels, the total viewing time may be less for channel one due to a relatively low compression rate and/or relatively high video quality, as compared to other channels). For channel two, the percent of content items is greater than the percent of total viewing time, and the percent of total viewing time is greater than the percent of total storage (e.g., channel two may have a relatively large number of small-sized content items, as compared to other channels). For channel three, the percent of content items is less than the percent of total storage and the percent of total storage is less than the percent of total viewing time (e.g., channel three may have a relatively small number of files with a relatively (cumulatively) long viewing time, but with a relatively high level of compression or a relatively low video quality, as compared to other channels). For channel four, the percent of content items, percent of total storage, and percent of total viewing time are equal.

Figure 11:
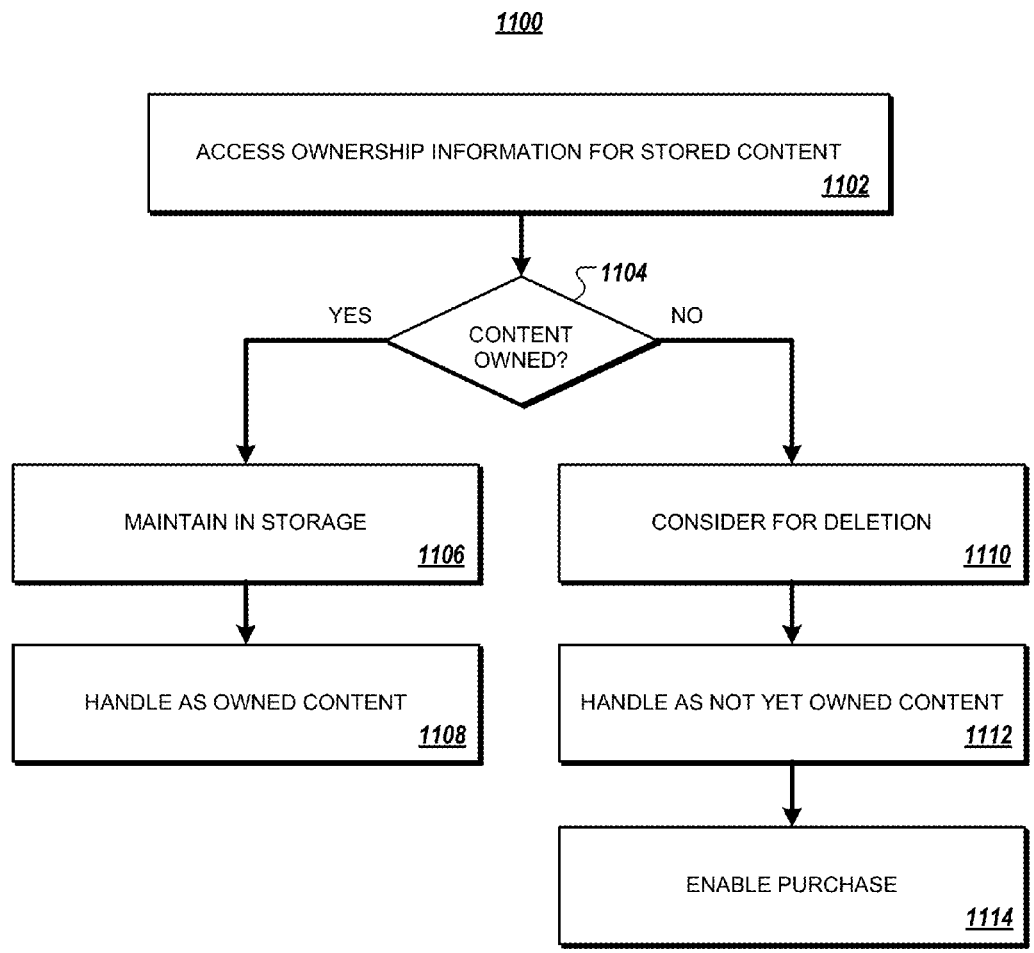

FIG. 11 illustrates a process 1100 for processing owned and not yet owned content. The operations of the process 1100 are described generally as being performed by the system 200. The operations of the process 1100 may be performed by one of the components of the system 200 (e.g., the server system 210) or may be performed by a combination of the components of the system 200. In some implementations, operations of the process 1100 may be performed by one or more processors included in one or more electronic devices.

The system 200 accesses ownership information for stored content (1102). Ownership information may be metadata associated with a content item. Ownership information may be stored, for example, in media player/downloader device storage in association with the content item and/or may be stored in a user database accessible to a server system (e.g., server system 210). Ownership information may indicate whether the content is licensed or license-free content. For licensed content, the ownership information may indicate whether a user has a license.

The system 200 determines whether the stored content is owned (1104). For example, the system 200 may determine whether the content is licensed or license-free content. For licensed content, the system 200 may determine whether a user has a license for the content, such as by comparing licensee information included in the accessed ownership information with information identifying the user of a media player/downloader device.

If the stored content is owned, the system 200 maintains the stored content in storage (1106) and handles the stored content as owned content (1108). For example, owned content may be excluded from consideration for deletion (e.g., such as if content files are deleted from media player/downloader storage to make room for new content). Owned content may never expire and, therefore, may never be automatically deleted to make room for new content. As another example, the system 200 may allow owned content to be transferred or copied to an external storage device.

If the stored content is not owned, the system 200 considers the stored content for deletion (1110). For example, the content may be considered for deletion to make room for new content. Content items with an older expiration date may be removed before content items with a newer expiration date.

The system 200 handles the stored content as not-yet-owned content (1112). For example, the system 200 might not allow the content to be transferred or copied to an external storage device unless or until the user purchases the content. The system 200 may use DRM (Digital Rights Management) to prevent unauthorized copying of the content. DRM may also be used to manage content expiration. Not yet owned content may expire, for example, if the content has been in media player/downloader storage for more than a certain time period (e.g., thirty days) or if the content has been viewed at least a certain number of times (e.g., three times).

Figure 12:
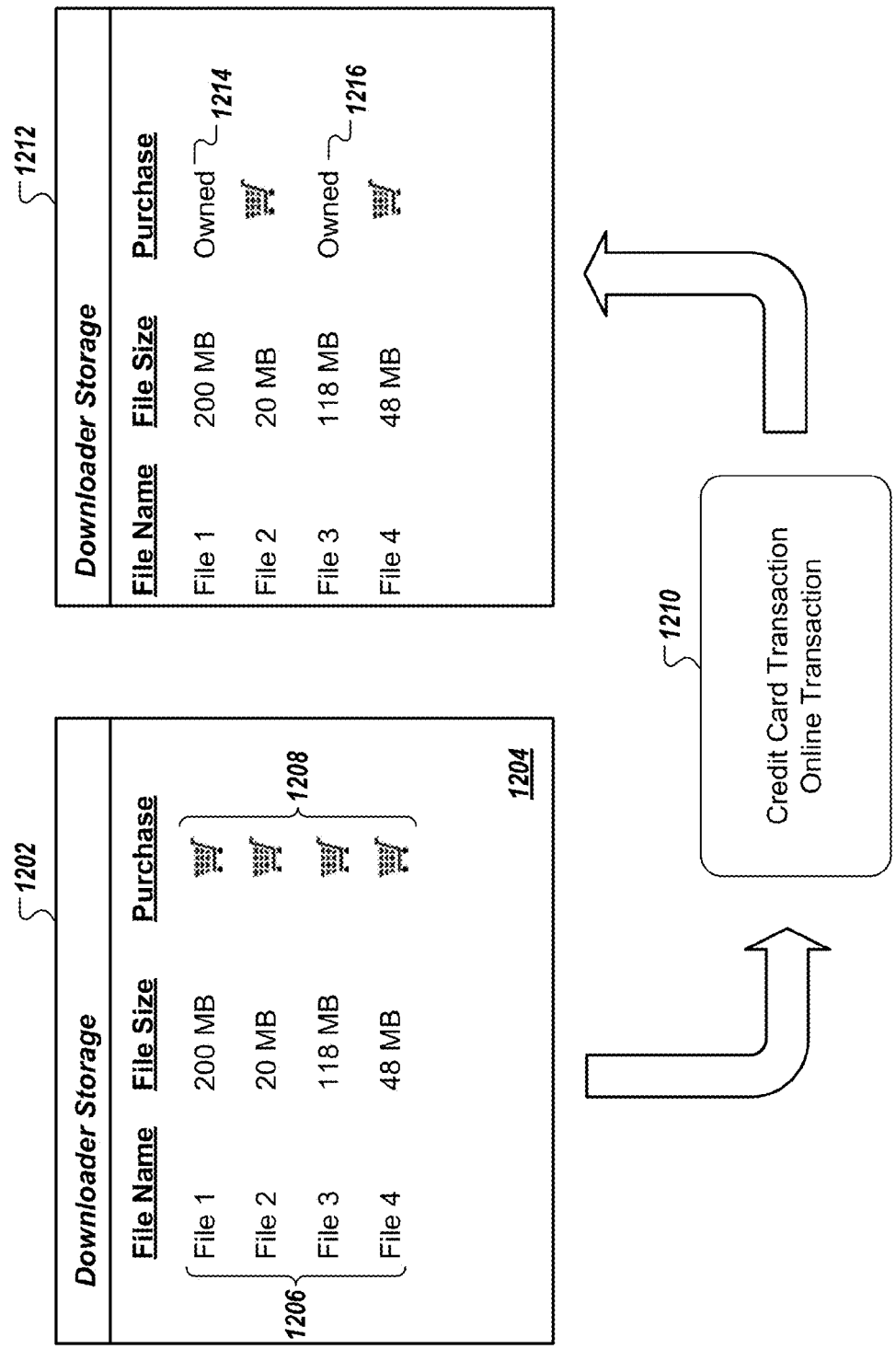
FIGS. 12 and 13 illustrate examples of purchasing of content.

The system 200 enables purchase of the stored content (1114). Content may be purchased, for example, using an end user portal or using a remote control device. For example, FIG. 12 illustrates an end user portal 1202. The end user portal 1202 displays an interface 1204 which includes a list of content items 1206. The list of content items 1206 displays, for each content item, a content file name, a content file size, and a purchase control 1208. A purchase control 1208 may be selected to purchase the respective content item.

For example, the user may select the purchase control 1208 for the content files one and three. The user may provide payment information to complete a transaction 1210 (e.g., a credit card transaction, an online payment transaction, an online shopping cart transaction, etc.). As illustrated in an end user portal 1212, indicators 1214 and 1216 may be displayed for the purchased content files one and three, to indicate that the user now owns these content items.

Figure 13:
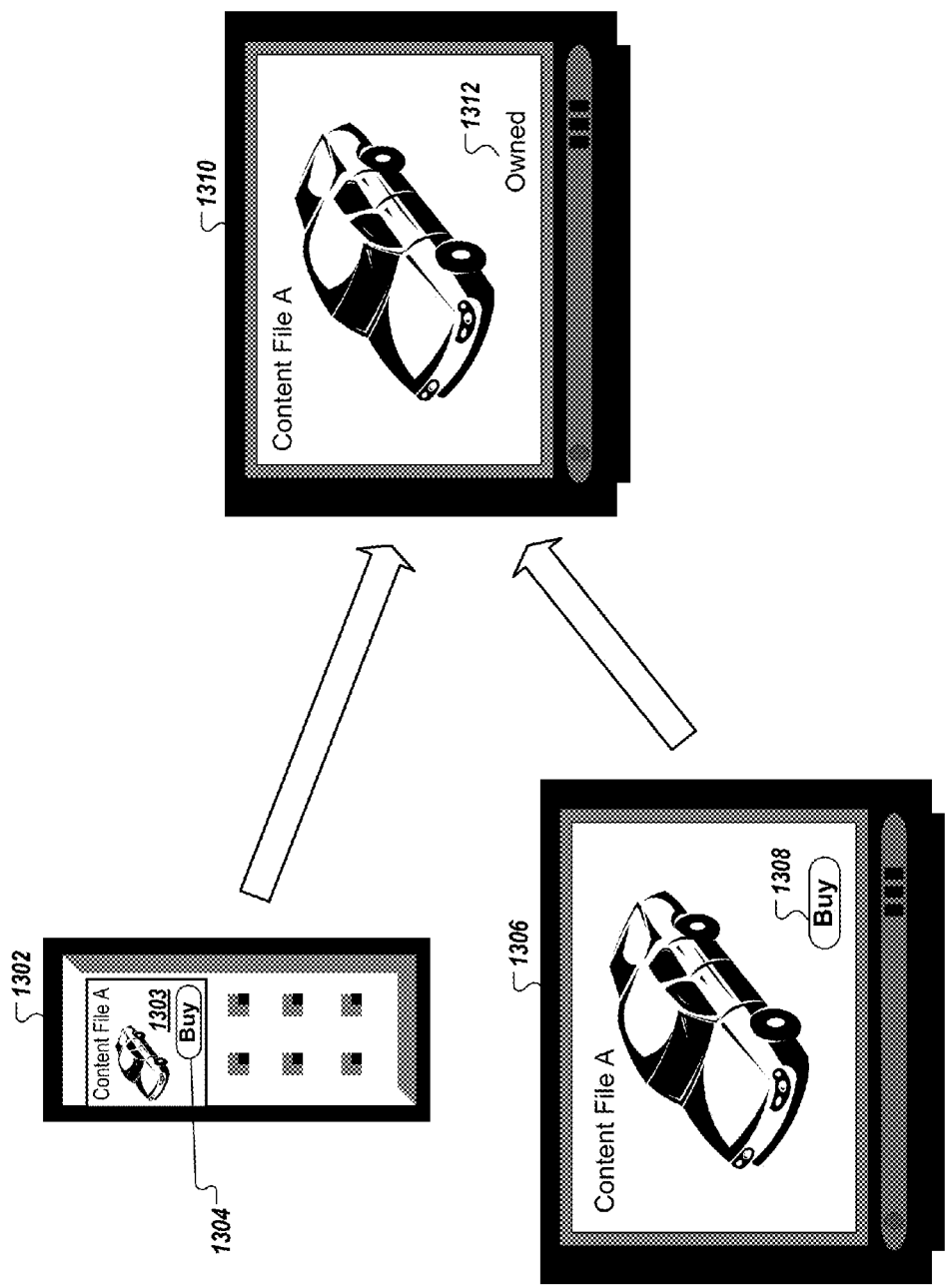

As another example and as illustrated in FIG. 13, the user may purchase a content item using a remote control device 1302. The remote control device 1302 may include a small display screen 1303. The small display screen 1303 may display information about a content item and may also display a purchase control 1304. The user may select the purchase control 1304 to purchase the content item. In some implementations, the purchase control 1304 is a software user interface control displayed on the display screen 1303 and, in other implementations, the purchase control 1304 is a physical button affixed to the remote control device 1302.

Information about a content item may also be displayed on a display screen 1306 (e.g., television screen). A purchase control 1308 may also be displayed on the display screen 1306. The user may select the purchase control 1308 (e.g., using a button on the remote control device 1302) to purchase the content item. After the user has purchased a content item, an indicator may be displayed for the content item, such as if a representation of the content item or information about the content item is displayed on a user interface (e.g., a user interface displayed on an end user portal or on a television screen). For example, information about a purchased content item is displayed on a display screen 1310, and an ownership indicator 1312 indicates that the content item is owned by the user.

Figure 14:
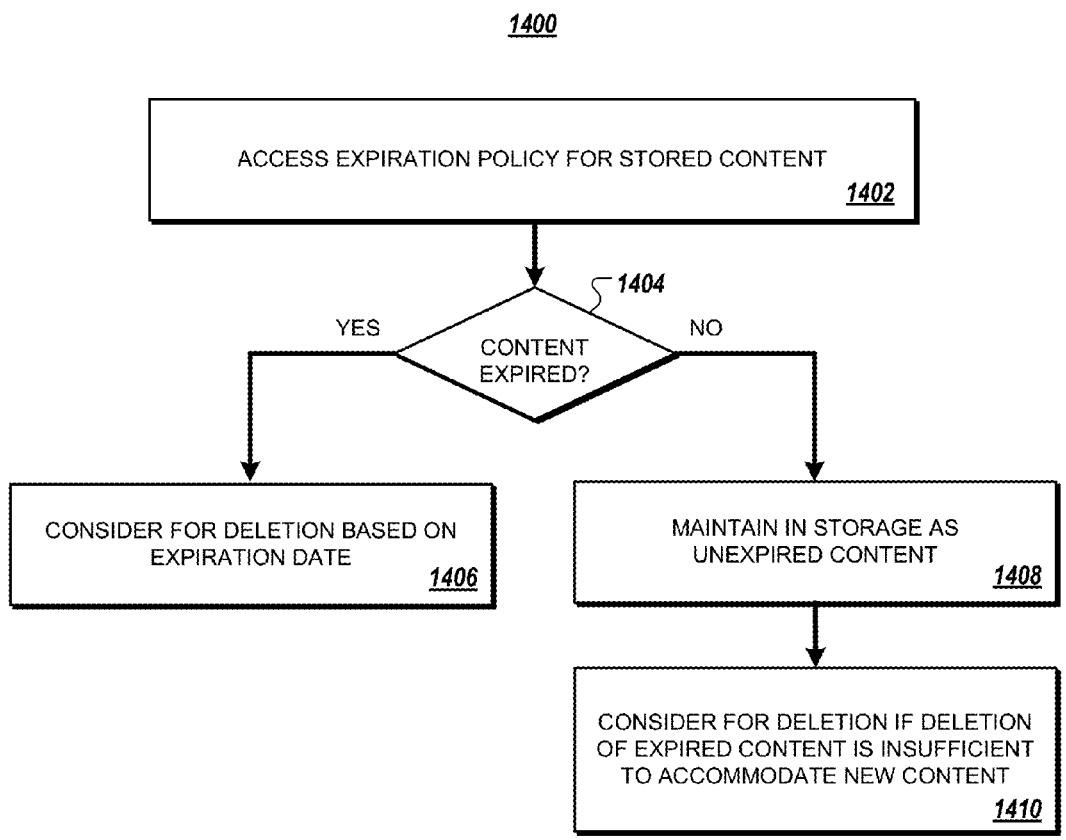

FIG. 14 illustrates a process 1400 for handling expired and unexpired content. The operations of the process 1400 are described generally as being performed by the system 200. The system 200 may periodically determine whether content is expired (e.g., the system 200 may periodically (such as, once per day) perform the process 1400). As another example, the system 200 may perform the process 1400 in response to a request to download new content. The operations of the process 1400 may be performed by one of the components of the system 200 (e.g., the server system 210) or may be performed by a combination of the components of the system 200. In some implementations, operations of the process 1400 may be performed by one or more processors included in one or more electronic devices.

The system 200 accesses an expiration policy for stored content (1402). An expiration policy may define criteria which may be used to determine whether content is expired. Expiration criteria may be defined, for example, for a channel, for a genre type, or for a particular content item. For example, FIG. 15 illustrates content expiration policies 1502, 1504, and 1506. Content expiration policy 1502 specifies that content on a news channel expires two weeks after being downloaded to a media player/downloader device. Content expiration policy 1504 specifies that content on a movie channel expires after the content is watched.

Content expiration policy 1506 specifies multiple criteria for a "DJ Channel" channel which includes multiple types of content. The expiration policy 1506 specifies that news content expires seven days after being downloaded to a media player/downloader device, that television show content expires thirty days after being downloaded to a media player/downloader device, and that all content expires after being watched. For example, if a first news content item is watched on the third day after being downloaded, the first news content item may expire after being watched. If a second news item remains unwatched for seven days after being downloaded, the second news item may expire at the end of the seventh day.

The content expiration policy 1506 specifies that a particular content item named "Show Two" expires ten days after being downloaded. Criteria that is more specific to a content item may override criteria that is more general. For example, if the "Show Two" content item is a television show, the criterion specifying that television show content expires after thirty days is applicable to the "Show Two" content item but is a more general criterion than the criterion that specifies that "Show Two" expires after ten days. The more specific criterion specifying expiration after ten days may be applied to the "Show Two" content item.

Returning to FIG. 14, the system 200 determines whether the stored content is expired (1404). The system 200 may determine whether the stored content is expired based on one or more accessed content expiration policies. For example and as shown in FIG. 15, the system 200 may determine whether content items 1508, 1510, 1512, 1514, and 1516 included in a news channel 1518 are expired based on the content expiration policy 1502.

As mentioned, the content expiration policy 1502 specifies that content items expire two weeks after being downloaded to a media player/downloader device. Suppose that the current date is November one. The content item 1508 was downloaded on October twenty six and has not been watched. The content item 1508 is not expired because two weeks have not passed since the content item 1508 was downloaded. The content item 1510 was downloaded and watched on October nineteen. Although the content item 1510 has been watched, the content item 1510 is not expired because two weeks have not passed since the content item 1510 was downloaded and because the content expiration policy 1502 does not include a criterion based on whether a content item has been watched. The content item 1512 was downloaded and watched on October twelve, and is expired because two weeks have passed since the download date (the expiration was not due to the content item 1512 being watched, however). Similarly, the content item 1516 was downloaded and watched on September twenty eight and expired two weeks later on October twelve. The content item 1514 was downloaded on October 5 and was not watched before it expired two weeks later on October nineteen.

Continuing the example of FIG. 15, the system 200 may determine whether content items 1520, 1522, 1524, 1526, and 1528 included in a movie channel 1530 are expired based on the content expiration policy 1504. As mentioned, the content expiration policy 1504 specifies that content expires after being watched (e.g., in contrast to the content expiration policy 1502, the content expiration policy 1504 is not based on download date). Content items 1522, 1524, and 1526 have not been watched and are therefore not expired. Content item 1520 was watched and expired on October twenty. Content item 1528 was watched and expired on October one.

The system 200 may determine whether content items 1532, 1534, 1536, 1538, and 1540 included in a "DJ Channel" channel 1542 are expired based on the content expiration policy 1506. The "DJ Channel" channel 1542 includes multiple types of content. As mentioned, the content expiration policy 1506 specifies that news content expires after seven days, that television show content expires after thirty days, and that all content expires after being watched. As mentioned above, suppose that the current date is November one. The content item 1532, a television show downloaded on October twenty six which has not been watched, is not expired since two weeks have not yet passed since the content item 1532 was downloaded. The content item 1534, which is a news program downloaded on October twenty five, expired after being watched on October twenty five. The content item 1538, which is a television show program downloaded on September fifteen, expired thirty days later on October fifteen. The content item 1540, which is a news program downloaded on September twenty eight, expired seven days later on October five.

The content item 1536 is a "Show Two" television show content item which is associated with a content-item-specific expiration criterion specified in the content expiration policy

1506. The content expiration policy 1506 specifies that a "Show Two" content item expires ten days after being downloaded. The content item 1536 was downloaded on October one and expired ten days later on October eleven. The content item 1536 may be identified as matching the "Show Two" content item specified in the content expiration policy 1506, for example, by the system 200 matching the content title of the content item 1536 to a content title specified in the content expiration policy 1506. As another example, the system 200 may associate the content item 1536 with the criteria for the "Show Two" content specified in the content expiration policy 1506 by using an identifier of the content item 1536 other than the content title.

Returning to FIG. 14, if the stored content is expired, the system 200 considers the stored content for deletion based on one or more expiration dates (1406). The system 200 may consider content items for deletion to make room for new content. In some implementations, all expired content is deleted before new content is downloaded. In other implementations, the system 200 determines a storage space needed to download new content and deletes some (or perhaps all) expired content so that an amount of available storage space is greater than or equal to the size of the new content. Content items may be selected for deletion based on oldest expiration date. For example and as shown in FIG. 15, a deletion order list 1544 lists expired content included in the channel 1518, 1530, or 1542, by order of oldest expiration date. The first content item to delete, based on oldest expiration date, is a "Movie Five" content item (e.g., content item 1528 included in the movie channel 1530).

If the content is not expired, the system 200 maintains the stored content in storage as unexpired content (1408). For example, the system 200 may maintain the stored content in storage of a media player/downloader device and may allow the user to watch (or re-watch) the content.

The system 200 considers the stored content for deletion if deletion of expired content is insufficient to accommodate new content (1410). For example, the system 200 may consider unexpired stored content for deletion if, after deleting expired content, the size of new content is greater than the amount of available storage. The system 200 may determine an order indicating when certain unexpired content items may expire and may select one or more "next-to-expire" unexpired content items for deletion.

For example and as shown in FIG. 15, the system 200 may determine which of the content items included in the channels 1518, 1530, and 1542 are next to expire. The system 200 may not be able to determine when the unexpired content items included in the channel 1530 (e.g., content items 1522, 1524, 1526) may expire, since the content expiration policy 1504 is based on a user-watched date. The system 200 may determine that the content item 1510 expires on November two, that the content item 1508 expires on November seven, and that the content item 1532 expires on November twenty six. Based on how much storage space is needed to accommodate new content, the system 200 may delete some or all of content items 1508, 1510, and 1532, with content item 1510 selected first, content item 1508 selected second, and content item 1532 selected third.

FIG. 16 illustrates a process 1600 for archiving content. The operations of the process 1600 are described generally as being performed by the system 200. The operations of the process 1600 may be performed by one of the components of the system 200 (e.g., the server system 210) or may be performed by a combination of the components of the system 200. In some implementations, operations of the process 1600 may be performed by one or more processors included in one or more electronic devices.

Figure 17:
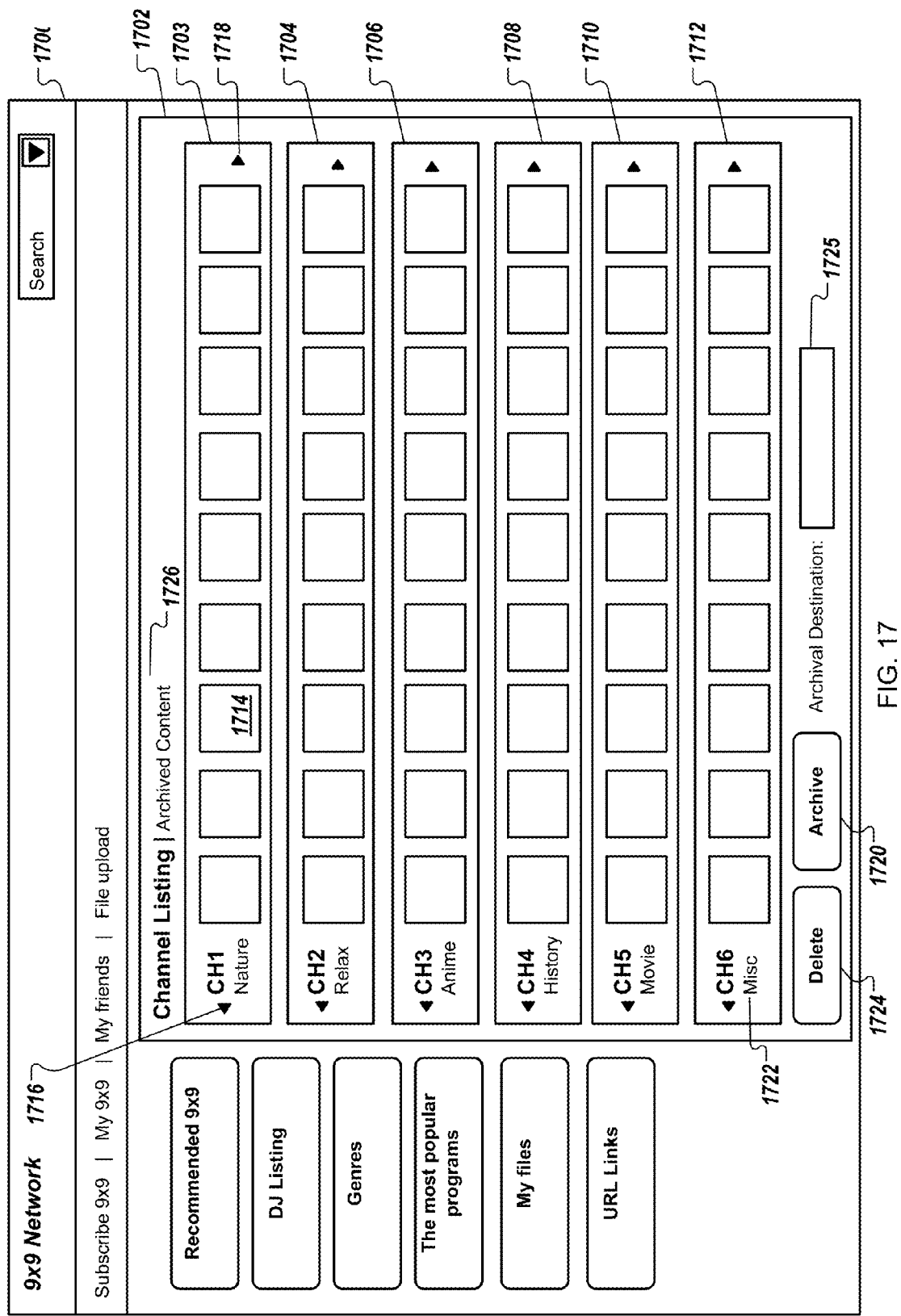
FIG. 17 illustrates an exemplary user interface.

The system 200 identifies content that is stored on a media player/downloader device and that is to be archived (1602). Content to be archived may be specified by a user using a user interface. For example, FIG. 17 illustrates a user interface 1700 for selecting content to archive. The user interface 1700 includes a channel listing area 1702 which includes channel areas 1703, 1704, 1706, 1708, 1710, and 1712. Each channel area 1703, 1704, 1706, 1708, 1710, and 1712 includes content representations. For example, the channel area 1703 corresponding to a channel one nature channel includes a content representation 1714. The content representation 1714 may be, for example, a content file name, a content title, or a content thumbnail.

The user may scroll to see additional content representations using arrow controls 1716 and 1718. The appearance of the content representation 1714 may be based on whether an associated content file has been completely downloaded. For example, if an associated content file has been completely downloaded, a black, bold font may be used for a content title displayed in the content representation 1714. As another example, if an associated content file has not completely downloaded, a light, gray font may be used for a content title displayed in the content representation 1714.

A user may select content files to archive by selecting one or more content representations (e.g., 1714) and then selecting an archive control 1720. A user may archive all content on one or more channels by selecting one or more channel names (e.g., channel name 1722) and then selecting the archive control 1720. The user may delete content from a media player/downloader device by selecting one or more content representations or one or more channel names and then selecting a delete control 1724. In some implementations, archiving may be enabled for content files owned by the user, but disabled for content files that are not owned by the user.

Returning to FIG. 16, the system 200 copies the identified content to an archival disk connected to the media player/downloader device (1604). Content may be archived, for example, to a particular location on an external storage device. For instance, in the example of FIG. 17, the user may specify an archival destination on an external storage device using a control 1725. An archival disk may be connected to a downloader device or a media player device using, for example, a USB connection. For example, in reference to FIG. 1, the external media storage device 136 is connected to the downloader device 132. As another example, the external media storage device 134 is connected to the media player device 130. An archival disk may also be accessible to the downloader device 132, for example, through a network connection.

The system 200 organizes the copied content on the archival disk to enable the copied content to be played by the media player/downloader device (1606). A user may select an archived content item to play using a user interface. For instance, in the example of FIG. 17, the user may toggle between a channel listing view and an archived content view using a control 1726. In an archived content view, to play an archived content item, the user may select a content representation representing an archived content item.

Figure 18:
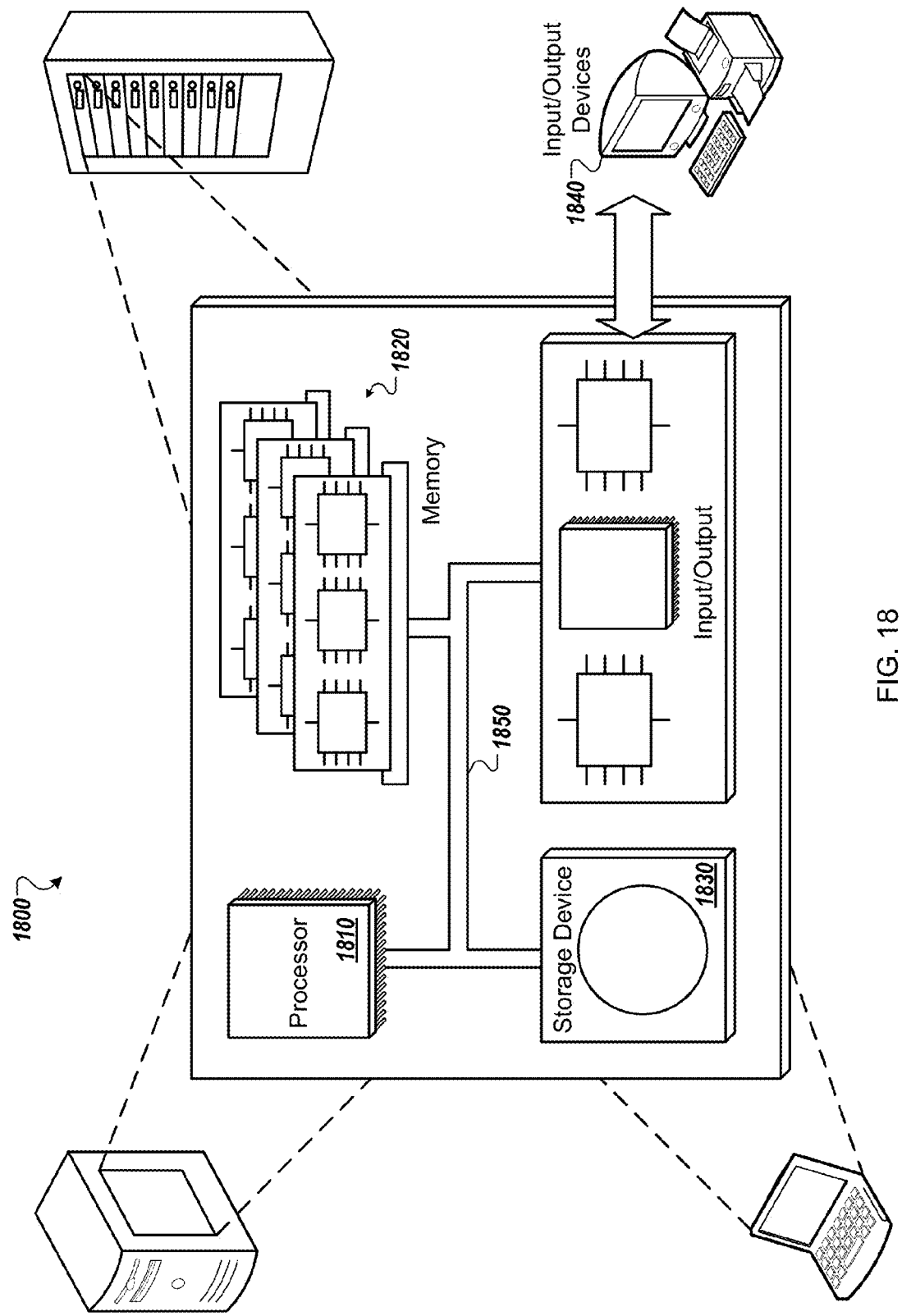

FIG. 18 is a schematic diagram of an example of a generic computer system 1800. The system 1800 can be used for the operations described in association with the processes 300, 500, 700, 900, 1100, 1400, and 1600, according to one implementation. For example, the system 1800 may be included in either or all of the server system 210 and the server 216.

The system 1800 includes a processor 1810, a memory 1820, a storage device 1830, and an input/output device 1840. Each of the components 1810, 1820, 1830, and 1840 are interconnected using a system bus 1850. The processor 1810 is capable of processing instructions for execution within the system 1800. In one implementation, the processor 1810 is a single-threaded processor. In another implementation, the processor 1810 is a multi-threaded processor. The processor 1810 is capable of processing instructions stored in the memory 1820 or on the storage device 1830 to display graphical information for a user interface on the input/output device 1840.

The memory 1820 stores information within the system 1800. In one implementation, the memory 1820 is a computer-readable medium. In one implementation, the memory 1820 is a volatile memory unit. In another implementation, the memory 1820 is a non-volatile memory unit.

The storage device 1830 is capable of providing mass storage for the system 1800. In one implementation, the storage device 1830 is a computer-readable medium. In various different implementations, the storage device 1830 may be a floppy disk device, a hard disk device, an optical disk device, or a tape device.

The input/output device 1840 provides input/output operations for the system 1800. In one implementation, the input/output device 1840 includes a keyboard and/or pointing device. In another implementation, the input/output device 1840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A method of controlling storage of content, the method comprising:
    determining a first amount of storage space that is available for storage of new content made available on channels subscribed to by a user;
    determining a second amount of storage space needed to store new content that has been made available on channels subscribed to by the user;
    comparing the second amount of storage space to the first amount of storage space;
    determining whether the second amount of storage space exceeds the first amount of storage space; and
    based on a determination that the second amount of storage space exceeds the first amount of storage space, controlling storage of the new content and deletion of previously-stored content based on a content allocation policy,
    wherein controlling storage of the new content and deletion of previously-stored content based on a content allocation policy comprises:
        defining a channel percentage allocation policy;
        analyzing channel information for the new content and the previously-stored content with respect to the channel percentage allocation policy; and
        controlling storage of the new content and deletion of the previously-stored content based on the analysis of the channel percentage allocation policy,
    wherein defining a channel percentage allocation policy comprises defining a channel percentage allocation policy in which a particular percentage of content items is allocated to each of the channels subscribed to by the user; and wherein analyzing channel information for the new content and the previously-stored content with respect to the channel percentage allocation policy comprises:

determining, for each channel subscribed to by the user, a percentage of content items included in new content associated with the channel and previously-stored content associated with the channel; and comparing, for each channel subscribed to by the user, the determined percentage of content items for the channel with the particular percentage of content items allocated to the channel; and wherein controlling storage of the new content and deletion of the previously-stored content based on the analysis of the channel percentage allocation policy comprises, based on the comparison of the determined percentage of content items with the particular percentage of content items, controlling, for each channel subscribed to by the user, storage of the new content for the channel and deletion of the previously-stored content for the channel such that a percentage of content items stored for the channel corresponds to the particular percentage of content items allocated to the channel.

2. The method of claim 1 wherein defining a channel percentage allocation policy comprises:

monitoring viewing behavior of one or more users;

based on the monitoring, determining viewing statistics for the one or more users; and defining the channel percentage allocation policy based on the determined viewing statistics.

3. The method of claim 1 wherein defining a channel percentage allocation policy comprises:

receiving user input from the user indicating a channel percentage allocation policy; and defining the channel percentage allocation policy based on the received user input.

4. A method of controlling storage of content, the method comprising:

determining a first amount of storage space that is available for storage of new content made available on channels subscribed to by a user;

determining a second amount of storage space needed to store new content that has been made available on channels subscribed to by the user;

comparing the second amount of storage space to the first amount of storage space;

determining whether the second amount of storage space exceeds the first amount of storage space; and based on a determination that the second amount of storage space exceeds the first amount of storage space, controlling storage of the new content and deletion of previously-stored content based on a content allocation policy, wherein controlling storage of the new content and deletion of previously-stored content based on a content allocation policy comprises:

defining a channel percentage allocation policy;

analyzing channel information for the new content and the previously-stored content with respect to the channel percentage allocation policy; and controlling storage of the new content and deletion of the previously-stored content based on the analysis of the channel percentage allocation policy, wherein defining a channel percentage allocation policy comprises defining a channel percentage allocation policy in which a particular percentage of viewing time of content is allocated to each of the channels subscribed to by the user; and wherein analyzing channel information for the new content and the previously-stored content with respect to the channel percentage allocation policy comprises:

determining, for each channel subscribed to by the user, a percentage of viewing time included in new content associated with the channel and previously-stored content associated with the channel; and comparing, for each channel subscribed to by the user, the determined percentage of viewing time for the channel with the particular percentage of viewing time allocated to the channel; and wherein controlling storage of the new content and deletion of the previously-stored content based on the analysis of the channel percentage allocation policy comprises, based on the comparison of the determined percentage of viewing time with the particular percentage of viewing time, controlling, for each channel subscribed to by the user, storage of the new content for the channel and deletion of the previously-stored content for the channel such that a percentage of viewing time of content stored for the channel corresponds to the particular percentage of viewing time allocated to the channel.

5. The method of claim 4 wherein defining a channel percentage allocation policy comprises:

monitoring viewing behavior of one or more users;

based on the monitoring, determining viewing statistics for the one or more users; and defining the channel percentage allocation policy based on the determined viewing statistics.

6. The method of claim 4 wherein defining a channel percentage allocation policy comprises:

receiving user input from the user indicating a channel percentage allocation policy; and defining the channel percentage allocation policy based on the received user input.

7. A method of controlling storage of content, the method comprising:

determining a first amount of storage space that is available for storage of new content made available on channels subscribed to by a user;

determining a second amount of storage space needed to store new content that has been made available on channels subscribed to by the user;

comparing the second amount of storage space to the first amount of storage space;

determining whether the second amount of storage space exceeds the first amount of storage space; and based on a determination that the second amount of storage space exceeds the first amount of storage space, controlling storage of the new content and deletion of previously-stored content based on a content allocation policy, wherein controlling storage of the new content and deletion of previously-stored content based on a content allocation policy comprises:

for each channel subscribed to by the user, determining a number of content items for the channel;

for each channel subscribed to by the user, determining a total storage space used by the channel;

for each channel subscribed to by the user, determining a total viewing time of content stored for the channel; and balancing the number of content items, the total storage space, and the total viewing time in allocating storage among the channels subscribed to by the user.

8. A method of controlling storage of content, the method comprising:
determining a first amount of storage space that is available for storage of new content made available on channels subscribed to by a user;
determining a second amount of storage space needed to store new content that has been made available on channels subscribed to by the user;
comparing the second amount of storage space to the first amount of storage space;
determining whether the second amount of storage space exceeds the first amount of storage space; and
based on a determination that the second amount of storage space exceeds the first amount of storage space, controlling storage of the new content and deletion of previously-stored content based on a content allocation policy,
wherein controlling storage of the new content and deletion of previously-stored content based on a content allocation policy comprises controlling storage of the new content and deletion of previously-stored content based on a content expiration policy,
wherein controlling storage of the new content and deletion of previously-stored content based on a content expiration policy comprises:
accessing an expiration policy for stored content;
determining whether the stored content is expired based on the accessed expiration policy;
based on a determination that the stored content is expired, considering the stored content for deletion based on expiration date; and
based on a determination that the stored content is not expired, maintaining the stored content in storage as unexpired,
wherein accessing an expiration policy for stored content comprises:
accessing, for a first content item, a first expiration policy that defines an expiration policy for a first genre of content items to which the first content item corresponds;
accessing, for a second content item, a second expiration policy that defines an expiration policy for a second genre of content items to which the second content item corresponds, the second expiration policy being different than the first expiration policy and the second genre of content items being different than the first genre of content items;
accessing, for a third content item, a third expiration policy defined by a content curator for a channel that includes the third content item, the third expiration policy being an expiration policy for the first genre of content items to which the third content item corresponds and being different than the first expiration policy;
accessing, for a fourth content item, a fourth expiration policy defined specifically for the fourth content item; and
wherein determining whether the stored content is expired based on the accessed expiration policy comprises determining whether the first content item is expired based on the first expiration policy, determining whether the second content item is expired based on the second expiration policy, determining whether the third content item is expired based on the third expiration policy, and determining whether the fourth content item is expired based on the fourth expiration policy.

9. A system comprising:
at least one computer; and
at least one computer-readable medium coupled to the at least one computer having instructions stored thereon which, when executed by the at least one computer, causes the at least one computer to perform operations comprising:
determining a first amount of storage space that is available for storage of new content made available on channels subscribed to by a user;
determining a second amount of storage space needed to store new content that has been made available on channels subscribed to by the user;
comparing the second amount of storage space to the first amount of storage space;
determining whether the second amount of storage space exceeds the first amount of storage space; and
based on a determination that the second amount of storage space exceeds the first amount of storage space, controlling storage of the new content and deletion of previously-stored content based on a content allocation policy,
wherein controlling storage of the new content and deletion of previously-stored content based on a content allocation policy comprises:
defining a channel percentage allocation policy;
analyzing channel information for the new content and the previously-stored content with respect to the channel percentage allocation policy; and
controlling storage of the new content and deletion of the previously-stored content based on the analysis of the channel percentage allocation policy,
wherein defining a channel percentage allocation policy comprises defining a channel percentage allocation policy in which a particular percentage of content items is allocated to each of the channels subscribed to by the user; and
wherein analyzing channel information for the new content and the previously-stored content with respect to the channel percentage allocation policy comprises:
determining, for each channel subscribed to by the user, a percentage of content items included in new content associated with the channel and previously-stored content associated with the channel; and
comparing, for each channel subscribed to by the user, the determined percentage of content items for the channel with the particular percentage of content items allocated to the channel; and
wherein controlling storage of the new content and deletion of the previously-stored content based on the analysis of the channel percentage allocation policy comprises, based on the comparison of the determined percentage of content items with the particular percentage of content items, controlling, for each channel subscribed to by the user, storage of the new content for the channel and deletion of the previously-stored content for the channel such that a percentage of content items stored for the channel corresponds to the particular percentage of content items allocated to the channel.

10. The system of claim 9 wherein defining a channel percentage allocation policy comprises:
monitoring viewing behavior of one or more users;
based on the monitoring, determining viewing statistics for the one or more users; and defining the channel percentage allocation policy based on the determined viewing statistics.

11. The system of claim 9 wherein defining a channel percentage allocation policy comprises:
receiving user input from the user indicating a channel percentage allocation policy; and
defining the channel percentage allocation policy based on the received user input.

12. A system comprising:
at least one computer; and
at least one computer-readable medium coupled to the at least one computer having instructions stored thereon which, when executed by the at least one computer, causes the at least one computer to perform operations comprising:
determining a first amount of storage space that is available for storage of new content made available on channels subscribed to by a user;
determining a second amount of storage space needed to store new content that has been made available on channels subscribed to by the user;
comparing the second amount of storage space to the first amount of storage space;
determining whether the second amount of storage space exceeds the first amount of storage space; and
based on a determination that the second amount of storage space exceeds the first amount of storage space, controlling storage of the new content and deletion of previously-stored content based on a content allocation policy,
wherein controlling storage of the new content and deletion of previously-stored content based on a content allocation policy comprises:
defining a channel percentage allocation policy;
analyzing channel information for the new content and the previously-stored content with respect to the channel percentage allocation policy; and
controlling storage of the new content and deletion of the previously-stored content based on the analysis of the channel percentage allocation policy,
wherein defining a channel percentage allocation policy comprises defining a channel percentage allocation policy in which a particular percentage of viewing time of content is allocated to each of the channels subscribed to by the user; and
wherein analyzing channel information for the new content and the previously-stored content with respect to the channel percentage allocation policy comprises:
determining, for each channel subscribed to by the user, a percentage of viewing time included in new content associated with the channel and previously-stored content associated with the channel; and
comparing, for each channel subscribed to by the user, the determined percentage of viewing time for the channel with the particular percentage of viewing time allocated to the channel; and
wherein controlling storage of the new content and deletion of the previously-stored content based on the analysis of the channel percentage allocation policy comprises, based on the comparison of the determined percentage of viewing time with the particular percentage of viewing time, controlling, for each channel subscribed to by the user, storage of the new content for the channel and deletion of the previously-stored content for the channel such that a percentage of viewing time of content stored for the channel corresponds to the particular percentage of viewing time allocated to the channel.

13. The system of claim 12 wherein defining a channel percentage allocation policy comprises:
monitoring viewing behavior of one or more users;
based on the monitoring, determining viewing statistics for the one or more users; and
defining the channel percentage allocation policy based on the determined viewing statistics.

14. The system of claim 12 wherein defining a channel percentage allocation policy comprises:
receiving user input from the user indicating a channel percentage allocation policy; and
defining the channel percentage allocation policy based on the received user input.

15. A system comprising:
at least one computer; and
at least one computer-readable medium coupled to the at least one computer having instructions stored thereon which, when executed by the at least one computer, causes the at least one computer to perform operations comprising:
determining a first amount of storage space that is available for storage of new content made available on channels subscribed to by a user;
determining a second amount of storage space needed to store new content that has been made available on channels subscribed to by the user;
comparing the second amount of storage space to the first amount of storage space;
determining whether the second amount of storage space exceeds the first amount of storage space; and
based on a determination that the second amount of storage space exceeds the first amount of storage space, controlling storage of the new content and deletion of previously-stored content based on a content allocation policy,
wherein controlling storage of the new content and deletion of previously-stored content based on a content allocation policy comprises:
for each channel subscribed to by the user, determining a number of content items for the channel;
for each channel subscribed to by the user, determining a total storage space used by the channel;
for each channel subscribed to by the user, determining a total viewing time of content stored for the channel; and
balancing the number of content items, the total storage space, and the total viewing time in allocating storage among the channels subscribed to by the user.

16. A system comprising:
at least one computer; and
at least one computer-readable medium coupled to the at least one computer having instructions stored thereon which, when executed by the at least one computer, causes the at least one computer to perform operations comprising:
determining a first amount of storage space that is available for storage of new content made available on channels subscribed to by a user;
determining a second amount of storage space needed to store new content that has been made available on channels subscribed to by the user;
comparing the second amount of storage space to the first amount of storage space;
determining whether the second amount of storage space exceeds the first amount of storage space; and based on a determination that the second amount of storage space exceeds the first amount of storage space, controlling storage of the new content and deletion of previously-stored content based on a content allocation policy, wherein controlling storage of the new content and deletion of previously-stored content based on a content allocation policy comprises controlling storage of the new content and deletion of previously-stored content based on a content expiration policy, wherein controlling storage of the new content and deletion of previously-stored content based on a content expiration policy comprises:
- accessing an expiration policy for stored content;
- determining whether the stored content is expired based on the accessed expiration policy;
- based on a determination that the stored content is expired, considering the stored content for deletion based on expiration date; and
- based on a determination that the stored content is not expired, maintaining the stored content in storage as unexpired, wherein accessing an expiration policy for stored content comprises:
- accessing, for a first content item, a first expiration policy that defines an expiration policy for a first genre of content items to which the first content item corresponds;
- accessing, for a second content item, a second expiration policy that defines an expiration policy for a second genre of content items to which the second content item corresponds, the second expiration policy being different than the first expiration policy and the second genre of content items being different than the first genre of content items;
- accessing, for a third content item, a third expiration policy defined by a content curator for a channel that includes the third content item, the third expiration policy being an expiration policy for the first genre of content items to which the third content item corresponds and being different than the first expiration policy;
- accessing, for a fourth content item, a fourth expiration policy defined specifically for the fourth content item; and wherein determining whether the stored content is expired based on the accessed expiration policy comprises determining whether the first content item is expired based on the first expiration policy, determining whether the second content item is expired based on the second expiration policy, determining whether the third content item is expired based on the third expiration policy, and determining whether the fourth content item is expired based on the fourth expiration policy.

* * * * *